(12) United States Patent
Athauda et al.

(10) Patent No.: US 11,015,799 B2
(45) Date of Patent: May 25, 2021

(54) TEXTILE OR FABRIC WITH ATTACHED FLEXIBLE AND CONFORMABLE LIGHT SOURCE APPARATUS

(71) Applicant: MAS Innovation (Private) Limited, Colombo (LK)

(72) Inventors: Tharindu Athauda, Colombo (LK); Kireety Madiraju, Colombo (LK)

(73) Assignee: MAS Innovation (Private) Limited, Colombo (LK)

( * ) Notice: Subject to any disclaimer, the term of this patent is extended or adjusted under 35 U.S.C. 154(b) by 155 days.

(21) Appl. No.: 15/546,501

(22) PCT Filed: Dec. 30, 2015

(86) PCT No.: PCT/SG2015/050514
§ 371 (c)(1),
(2) Date: Jul. 26, 2017

(87) PCT Pub. No.: WO2016/122399
PCT Pub. Date: Aug. 4, 2016

(65) Prior Publication Data
US 2018/0023801 A1    Jan. 25, 2018

(30) Foreign Application Priority Data
Jan. 27, 2015 (GB) ...................... 1501297

(51) Int. Cl.
*F21V 33/00* (2006.01)
*F21V 3/00* (2015.01)
(Continued)

(52) U.S. Cl.
CPC ............ *F21V 33/0008* (2013.01); *A41B 1/08* (2013.01); *A41B 11/00* (2013.01); *A41D 1/06* (2013.01);
(Continued)

(58) Field of Classification Search
CPC .... F21V 33/0008; F21V 31/00; F21V 31/005; F21V 33/0004
(Continued)

(56) References Cited

U.S. PATENT DOCUMENTS 4,602,191 A    7/1986  Davila
4,774,434 A    9/1988  Bennion
(Continued)

FOREIGN PATENT DOCUMENTS

CN    103423687 A    12/2013
CN    203322810 U    12/2013
(Continued)

OTHER PUBLICATIONS

Liu, Kai et al., Scratch-Resistant, Highly Conductive, and High-Strength Carbon Nanotube-Based Composite Yarns, American Chemical Society, Sep. 10, 2010, pp. 5827-5834.
(Continued)

*Primary Examiner* — William J Carter
(74) *Attorney, Agent, or Firm* — Patterson + Sheridan, LLP

(57) ABSTRACT

There is provided a device that requires the presence of a textile or fabric; and a flexible and conformable light source apparatus attached to the textile or fabric, where the light source apparatus requires: at least one light source; at least two conductive members having a first end and a second end, the first end is connected to the at least one light source and the second end is adapted to connect to a power source; and at least one transparent polymer layer that encapsulates the entirety of the at least one light source and at least part of the at least two conductive members.

20 Claims, 18 Drawing Sheets

(51) Int. Cl.

| | | |
|---|---|---|
| *F21V 7/04* | (2006.01) | |
| *F21V 19/00* | (2006.01) | |
| *A41D 27/08* | (2006.01) | |
| *A41D 13/01* | (2006.01) | |
| *H05B 47/11* | (2020.01) | |
| *H05B 47/12* | (2020.01) | |
| *A41B 1/08* | (2006.01) | |
| *A41B 11/00* | (2006.01) | |
| *A41D 1/06* | (2006.01) | |
| *A41D 29/00* | (2006.01) | |
| *A42B 1/242* | (2021.01) | |
| *A43B 3/00* | (2006.01) | |
| *B65D 33/00* | (2006.01) | |
| *D02G 3/44* | (2006.01) | |
| *F21S 9/02* | (2006.01) | |
| *F21V 23/06* | (2006.01) | |
| *B65D 30/00* | (2006.01) | |
| *F21V 23/02* | (2006.01) | |
| *F21V 23/04* | (2006.01) | |
| *F21Y 115/20* | (2016.01) | |
| *F21Y 115/10* | (2016.01) | |
| *F21Y 115/15* | (2016.01) | |

(52) U.S. Cl.
CPC ........... *A41D 13/01* (2013.01); *A41D 27/085* (2013.01); *A41D 29/00* (2013.01); *A42B 1/242* (2013.01); *A43B 3/001* (2013.01); *B65D 29/00* (2013.01); *B65D 33/004* (2013.01); *D02G 3/441* (2013.01); *F21S 9/02* (2013.01); *F21V 3/00* (2013.01); *F21V 7/04* (2013.01); *F21V 19/0015* (2013.01); *F21V 23/02* (2013.01); *F21V 23/0442* (2013.01); *F21V 23/0464* (2013.01); *F21V 23/0471* (2013.01); *F21V 23/06* (2013.01); *H05B 47/11* (2020.01); *H05B 47/12* (2020.01); *A41D 2600/20* (2013.01); *F21Y 2115/10* (2016.08); *F21Y 2115/15* (2016.08); *F21Y 2115/20* (2016.08)

(58) Field of Classification Search
USPC ................................................. 362/103, 108
See application file for complete search history.

(56) References Cited

U.S. PATENT DOCUMENTS

| | | | |
|---|---|---|---|
| 5,128,843 A | 7/1992 | Guritz | |
| 5,836,671 A | 11/1998 | Chien | |
| 6,517,214 B1 * | 2/2003 | Mitchell, Jr. | A41D 13/01 362/103 |
| 8,157,402 B2 * | 4/2012 | Huss | A42B 3/0433 362/103 |
| 2001/0004808 A1 * | 6/2001 | Hurwitz | A43B 3/001 362/103 |
| 2006/0082987 A1 | 4/2006 | Dorsey et al. | |
| 2006/0198128 A1 | 9/2006 | Piepgras et al. | |
| 2006/0269744 A1 | 11/2006 | Murasko et al. | |
| 2007/0053179 A1 | 3/2007 | Pang et al. | |
| 2007/0056074 A1 | 3/2007 | Esses | |
| 2008/0010877 A1 | 1/2008 | Deflin et al. | |
| 2008/0089056 A1 | 4/2008 | Grosjean | |
| 2009/0201672 A1 | 8/2009 | Lee | |
| 2009/0251077 A1 * | 10/2009 | Wilborn | A41D 27/085 362/103 |
| 2009/0303698 A1 | 12/2009 | Huss et al. | |
| 2010/0039802 A1 * | 2/2010 | Tuan | A45C 15/06 362/185 |
| 2010/0065873 A1 | 3/2010 | Bhattacharya et al. | |
| 2010/0226117 A1 | 9/2010 | Krans et al. | |
| 2011/0199758 A1 | 8/2011 | Yeh | |
| 2011/0211357 A1 | 9/2011 | Preuschl et al. | |
| 2011/0235311 A1 | 9/2011 | Stone | |
| 2011/0305006 A1 | 12/2011 | Hehenberger | |
| 2012/0099298 A1 | 4/2012 | Hsu | |
| 2012/0155065 A1 | 6/2012 | Ubaghs et al. | |
| 2013/0027963 A1 | 1/2013 | Van Herpen et al. | |
| 2013/0250603 A1 | 9/2013 | Begriche et al. | |
| 2014/0306250 A1 | 10/2014 | Gardner et al. | |
| 2014/0347845 A1 | 11/2014 | Pulido, Jr. | |

FOREIGN PATENT DOCUMENTS

| | | |
|---|---|---|
| GB | 2396252 A | 6/2004 |
| JP | H11339501 A | 12/1999 |
| JP | 2011-096901 A | 5/2011 |
| KR | 20090117210 A | 11/2009 |
| KR | 101035442 B1 | 5/2011 |
| TW | 200927005 A | 7/2009 |
| WO | 03094719 A1 | 11/2003 |
| WO | 2008/043103 A2 | 4/2008 |
| WO | 2009/075550 A2 | 6/2009 |

OTHER PUBLICATIONS

Gale, G.D. et al., Infrared therapy for chronic low back pain: A randomized, controlled trial, Pain Res Manage, 2006, pp. 193-196.

Waktin, S.L. et al., A Comparison of Pulse Oximetry and Near Infrared Spectroscopy (NIRS) in the Detection of Hypdxaemia Occurring With Pauses in Nasal Airflow in Neonates, Kluwer Academic Publishers, Oct. 21, 1999, pp. 441-447.

Frost, MD Elizabeth A.M., Cerebral Oximetry Emerging Applications for an Established Technology, McMahon Publishing, Oct. 2012, pp. 27-34.

UK Search Report dated Jun. 2, 2015 for Application No. GB1501297.4.

International Search Report and Written Opinion dated Mar. 15, 2016 for Application No. PCT/SG2015/050514.

First Office Action in related application EP 15823838.6 dated Oct. 9, 2019.

First Office Action in related application JP 2017-540634 dated Oct. 21, 2019.

First Office Action in application EP 15823839.4 dated Oct. 10, 2019.

First Office Action in application JP 2017-540635 dated Oct. 21, 2019.

First Chinese Office Action (with English translation) for corresponding CN 201580078283.4, dated Dec. 10, 2018.

Second Chinese Office Action (with English translation) for corresponding CN 201580078283.4, dated Aug. 27, 2019.

First Chinese Office Action (with English translation) for corresponding CN 201580078303.8, dated Dec. 10, 2018.

Second Chinese Office Action (with English translation) for corresponding CN 201580078303.8, dated Aug. 30, 2019.

International Search Report and Written Opinion dated Mar. 15, 2016 for Application No. PCT/SG2015/050515.

U.S. Office Action in related U.S. Appl. No. 15/546,610 dated Aug. 30, 2018.

Third Office Action in related application CN 201580078283.4 dated Feb. 25, 2020.

Decision of Rejection in related application CN 201580078303.8 dated Mar. 2, 2020.

Second Office Action in related application JP 2017-540634 dated Apr. 3, 2020.

Second Office Action in related application JP 2017-540635—dated Apr. 3, 2020.

* cited by examiner

TEXTILE OR FABRIC WITH ATTACHED FLEXIBLE AND CONFORMABLE LIGHT SOURCE APPARATUS

FIELD OF INVENTION

The current application relates to textiles or fabrics that include flexible and conformable light strips that are also washable as part of the textile or fabric. In particular, the current invention relates to garments that incorporate a flexible illumination/light device.

BACKGROUND

The listing or discussion of an apparently prior-published document in this specification should not necessarily be taken as an acknowledgement that the document is part of the state of the art or is common general knowledge.

Workers, commuters, children and exercisers may all have to venture outside in low-light conditions for various reasons. However, venturing outside in such conditions can be potentially dangerous because it may be difficult for others (e.g. a driver of a motor vehicle) to distinguish the person when the light levels are low. This can lead to feelings of discomfort, anxiety and danger in the person who has to venture outside.

In order to improve the visibility of people outside, light coloured clothing has been used to help provide observers a greater chance of spotting a person outside in low-light conditions. To help improve visibility further, passive reflective elements in apparel are also often used. Light clothing and passive elements only really help to increase visibility when light from an external light source, like street lighting or light from a vehicle's headlamps, strikes the person.

To improve safety for people having to venture outside in low-light conditions, various garments have been developed that contain some sort of lighting device integrated into or onto said garment. However, to date, these lighting devices have suffered from various problems, such as being bulky and uncomfortable to wear, having to remove the lighting device from the garment before washing, lack of shock resistance and a lack of resistance to local (e.g. caused by the body of the wearer) or more general (e.g. the weather) environmental conditions.

Thus, there remains a need for a garment that is more comfortable and useable by an individual who needs to operate in low-light conditions. Further, there is also a need for an easy to maintain garment that does not require significant time to disassemble and reassemble before and after washing, respectively. Yet further, there remains a need for garments that integrate electronic component parts that are thin (e.g. a single layer of fabric), but where the electronic components do not make the garment uncomfortable for the wearer.

In addition to the above, there is a great unmet need in the unobtrusive integration of materials that can be used to supply light for a variety of means, in addition to or in place of simple illumination.

SUMMARY OF INVENTION

In a first aspect of the invention, there is provided a device comprising a textile or fabric and a flexible and conformable light source apparatus attached to the textile or fabric, wherein the light source apparatus comprises at least one light source at least two conductive members having a first end and a second end, the first end is connected to the at least one light source and the second end is adapted to connect to a power source and at least one transparent polymer layer that encapsulates the entirety of the at least one light source and at least part of the at least two conductive members.

In an embodiment of the invention, the light source may be selected from one or more of the group consisting of a light emitting diode (LED), an organic light emitting diode (OLED) and an electroluminescent material, optionally wherein the light source further comprises an optical channelling device (e.g. an optical fibre).

In certain embodiments of the invention, the light source may be attached to the textile or fabric by the at least one transparent polymer layer.

In further embodiments of the invention, the flexible and conformable light source apparatus may further comprise at least one flexible substrate with at least one electrical circuit thereon, where the at least one light source is attached to the at least one flexible substrate through the at least one electrical circuit and the at least one electrical circuit is connected to the at least two conductive members. In certain embodiments, the at least one light source may be attached to the at least one electrical circuit by an isotropic conductive adhesive or by soldering. In still further embodiments, the at least one electrical circuit may comprise silver and/or copper. In still further embodiments, the at least one electrical circuit is a printed electrical circuit or a lithographically etched electrical circuit.

In yet still further embodiments of the invention, the conductive members may be one or more of the group selected from a wire, a conductive yarn, a screen-printed conductive path and combinations thereof.

In further embodiments of the invention, the device may further comprise a power supply unit and an electrical interconnect to connect the power supply unit to the light source apparatus.

In certain embodiments of the invention, the electrical interconnect may comprise a first flexible interconnect component that is attached to the textile or fabric and to the second end of the at least two conductive members, comprising at least one first magnetic part and a first housing having a first contact surface, the first housing being adapted to securely hold the at least one first magnetic part, such that the at least one first magnetic part protrudes from the first contact surface and/or forms a recess in said surface, and a second flexible and/or rigid interconnect component that is attached to the power supply unit, comprising at least one second magnetic part and a second housing having a second contact surface, the second housing being adapted to securely hold the at least one second magnetic part, such that the at least one second magnetic part protrudes from the second contact surface and/or forms a recess in said surface, wherein, the at least one first and the at least one second magnetic parts are complementarily positioned in the first and second housings, respectively, to enable coupling of the first and second contact surfaces through magnetic interaction, electricity and/or signalling data is conducted through the first and second magnetic parts when coupled and the at least first and at least second magnetic parts protrude from and/or are recessed into the first and second contact surfaces by from 10 μm to 500 μm (e.g. from 25 μm to 250 μm, such as 100 μm).

In still further embodiments, the electrical interconnect may further comprise a mechanical coupling mechanism, optionally wherein the mechanical coupling mechanism comprises at least one section containing at least one groove on the contact surface of the first housing arranged to releasably bind to a complementary projection on the contact surface of the second housing or vice versa.

In yet still further embodiments, the at least one first magnetic part and the at least one second magnetic part of the first and second electrical interconnect components, respectively, independently comprise from one to twenty magnets (e.g. from two to fifteen, such as three to eight magnets). In still further embodiments, the number of magnets of the first magnetic part and the number of magnets of the second magnetic part are different. In certain embodiments, each magnet may comprise a magnet core and a non-magnet, conductive outer shell, optionally wherein the conductive outer shell is one or more of a material selected from aluminium, copper, lead, nickel, tin, titanium, zinc, gold, silver, platinum, cobalt, lithium, tungsten, beryllium, bismuth, cerium, cadmium, niobium, indium, gallium, germanium, selenium, tantalum, tellurium, vanadium, zirconium and iron.

In yet still further embodiments, the adaption of the first housing and/or the second housing to securely hold the respective at least one first and/or at least second magnetic part may comprise an individual hole in the respective housing for each individual magnet, where each individual hole in the respective housing is substantially perpendicular to the respective contact surface. For example, each individual hole may independently be selected from a through-hole or a blind hole having at least one wall, where the at least one wall further comprises an aperture suitable for a flexible conductive member (e.g. a wire, metal strips or conductive yarns). In certain embodiments, the first housing may be made from one or more of a material selected from the group consisting of leather, a synthetic leather, a rexine, silicone, a hard fabric, flexible polyurethane, polyethylene napthalene, urethane, thermoplastic polyurethane (TPU), natural rubber and synthetic rubber.

In yet still further embodiments,
(a) the magnets of the first and second magnetic parts may protrude from the first and second contact surfaces; or
(b) all of the magnets of the first magnetic part may protrude from the first contact surfaces and all of the second magnetic parts are recessed into the second contact surface or vice versa; or
(c) some of the magnets of the first and second magnetic parts may protrude from the first and second contact surfaces with the remainder recessed into said surfaces such that the protruding magnets of the first magnetic part meet a complementary magnet protruding from or recessed into the surface of the second contact surface and vice versa.

In yet still further embodiments of the invention:
(a) the power supply unit may comprise a battery and a DC-DC boost converter; and/or
(b) the power supply unit may further comprise a switching module adapted to control a number of lighting modes of the light source; and/or
(c) the power supply unit may further comprise an ambient light detector adapted to control the brightness of the light source based upon the ambient light conditions, optionally wherein one or more of the lighting modes of the switching module is controlled fully or in part by the ambient light detector; and/or
(d) a proximity sensor to control the brightness depending on the closeness to an object; and/or
(e) a sound detector to control the brightness depending on the ambient volume; and/or
(f) a temperature sensor to control the brightness depending on the temperature.

In yet still further embodiments, the textile and/or fabric may be formed into a garment or a bag. For example, when the textile and/or fabric is formed into a garment, the garment is selected from shorts, socks, T-shirts, trousers, leggings, shirts, caps, footwear and accessories (e.g. head bands, arm warmers, wristbands) uniforms for rescue workers, night patrol, construction or safety wear, winter sports, and mountaineering clothing and gear.

In certain embodiments, the flexible and conformable light source apparatus may have a thickness that is less than or equal to 1000 µm (e.g. 750 µm). In alternative embodiments, the flexible and conformable light source apparatus may have a thickness that is less than or equal to 350 µm.

In certain embodiments, the flexible and conformable light source apparatus may have a bending radius of from 0.001 mm to 10 mm, such as from 0.01 mm to 1 mm, from 1 mm to 10 mm, or less than or equal to 5 mm. In additional or alternative embodiments (e.g. when using conventional-type LEDs), when the flexible and conformable light source apparatus has more than one light source, the distance between the light sources is at least 0.1 cm In yet still further embodiments, the at least one transparent polymer layer may be a material selected from one or more of the group consisting of TPU, a silicone-based polymer, a plasma-treated textile substrate and a water repellent textile substrate, optionally wherein the at least one transparent polymer layer may be a material selected from one or more of the group consisting of TPU and a silicone-based polymer.

In yet still further embodiments, the at least one light source is positioned to face towards the textile or fabric, optionally wherein an opening in the fabric or textile aligns with the at least one light source. In an alternative embodiment, the at least one light source may be positioned to face away from the textile or fabric.

In further embodiments, when the at least one flexible substrate and textile or fabric define a plane, the flexible and conformable light source apparatus may further comprise at least one reflective object adjacent to the at least one light source on said plane and the at least one light source is positioned on the flexible substrate at an angle on said plane such that light generated from the at least one light source is reflected by the at least one reflective object. For example, the at least one reflective object may have a shape selected from the group consisting of a prism, a sphere or part thereof, a concave cup shape, a retroreflective tunnel and one or more fibre optic cables. When used herein, a "retroreflective tunnel" refers to a conduit having a clear outer layer and a retroreflective inner layer (or vice versa), where the retroreflective layer contains gaps such that light may escape to cause the retroreflective tunnel to glow.

In still further embodiments, the flexible substrate may be made from one or more of the group selected from polyethylene naphthalate, polyethylene terephthalate, polyimide.

In yet still further embodiments, the device of the current invention may be washed at least up to 30 times (e.g. at least up to 50 times, such as at least up to 100 times) without affecting the function of the flexible and conformable light source apparatus attached to the textile or garment.

In yet further embodiments, the at least two conductive members may be electrically insulated across their entire length, except at a first portion adjacent to and including the first end and a second portion adjacent to and including the second end, both of which are uninsulated and the first portions of the at least two conductive members are fully encapsulated by the at least one transparent polymer layer.

In embodiments of the invention where the device forms or is part of a garment, then the flexible and conformable light source apparatus may be located at any position in said garment. For example, the flexible and conformable light source apparatus might not restrict the movement of a wearer of a garment and/or cause the wearer any discomfort (e.g. due to the thinness of the device).

Yet further aspects and embodiments of the current invention are disclosed in the following numbered clauses.

1. A device comprising:
    a textile or fabric; and
    a flexible and conformable light source apparatus attached to the textile or fabric, wherein the light source apparatus comprises:
        at least one light source;
        at least two conductive members having a first end and a second end, the first end is connected to the at least one light source and the second end is adapted to connect to a power source; and
        at least one transparent polymer layer that encapsulates the entirety of the at least one light source and at least part of the at least two conductive members.
2. The device according to Clause 1, wherein the light source is selected from one or more of the group consisting of a light emitting diode (LED), an organic light emitting diode (OLED) and an electroluminescent material, optionally wherein the light source further comprises an optical channelling device (e.g. an optical fibre).
3. The device according to Clause 1 or Clause 2, wherein the light source is attached to the textile or fabric by the at least one transparent polymer layer.
4. The device according to any one of the preceding clauses, wherein the flexible and conformable light source apparatus further comprises at least one flexible substrate with at least one electrical circuit thereon, where the at least one light source is attached to the at least one flexible substrate through the at least one electrical circuit and the at least one electrical circuit is connected to the at least two conductive members, optionally wherein:
    (a) the at least one light source is attached to the at least one electrical circuit by an isotropic conductive adhesive; and/or
    (b) the at least one electrical circuit comprises silver and/or copper; and/or
    (c) the at least one electrical circuit is a printed electrical circuit or a lithographically etched electrical circuit.
5. The device according to any one of the preceding clauses, wherein the conductive members may be one or more of the group selected from a wire, a conductive yarn, a screen-printed conductive path (e.g. a conductive paste) and combinations thereof.
6. The device according to any one of the preceding clauses, wherein the device further comprises a power supply unit and an electrical interconnect to connect the power supply unit to the light source apparatus.
7. The device according to Clause 6, wherein the electrical interconnect comprises:
    a first flexible interconnect component that is attached to the textile or fabric and to the second end of the at least two conductive members, comprising:
        at least one first magnetic part; and
        a first housing having a first contact surface, the first housing being adapted to securely hold the at least one first magnetic part, such that the at least one first magnetic part protrudes from the first contact surface and/or forms a recess in said surface; and
    a second flexible and/or rigid interconnect component that is attached to the power supply unit, comprising:
        at least one second magnetic part; and
        a second housing having a second contact surface, the second housing being adapted to securely hold the at least one second magnetic part, such that the at least one second magnetic part protrudes from the second contact surface and/or forms a recess in said surface,
    wherein,
        the at least one first and the at least one second magnetic parts are complementarily positioned in the first and second housings, respectively, to enable coupling of the first and second contact surfaces through magnetic interaction;
        electricity and/or signalling data is conducted through the first and second magnetic parts when coupled;
        the at least first and at least second magnetic parts protrude from and/or are recessed into the first and second contact surfaces by from 10 µm to 500 µm (e.g. from 25 µm to 250 µm, such as 100 µm).
8. The device according to Clause 7, wherein the electrical interconnect further comprises a mechanical coupling mechanism, optionally wherein the mechanical coupling mechanism comprises at least one section containing at least one groove on the contact surface of the first housing arranged to releasably bind to a complementary projection on the contact surface of the second housing or vice versa.
9. The device according to Clause 7 or Clause 8, wherein the at least one first magnetic part and the at least one second magnetic part of the first and second electrical interconnect components, respectively, independently comprise from one to twenty magnets (e.g. from two to fifteen, such as three to eight magnets).
10. The device according to Clause 9, wherein the number of magnets of the first magnetic part and the number of magnets of the second magnetic part are different.
11. The device according to Clause 10 or Clause 11, wherein the adaption of the first housing and/or the second housing to securely hold the respective at least one first and/or at least second magnetic part comprises an individual hole in the respective housing for each individual magnet, where each individual hole in the respective housing is substantially perpendicular to the respective contact surface.
12. The device according to Clause 11, wherein each individual hole is independently selected from a through-hole or a blind hole having at least one wall, where the at least one wall further comprises an aperture suitable for a flexible conductive member (e.g. a wire, metal strips or conductive yarns).
13. The device according to any one of Clauses 7 to 12, wherein each magnet comprises a magnet core and a non-magnet, conductive outer shell, optionally wherein the conductive outer shell is one or more of a material selected from aluminium, copper, lead, nickel, tin, titanium, zinc, gold, silver, platinum, cobalt, lithium, tungsten, beryllium, bismuth, cerium, cadmium, niobium, indium, gallium, germanium, selenium, tantalum, tellurium, vanadium, zirconium and iron.
14. The device according to any one of Clauses 7 to 13, wherein the first housing is made from one or more of a material selected from the group consisting of leather, a synthetic leather, a rexine, silicone, a hard fabric, flexible polyurethane, polyethylene napthalene, urethane, TPU, natural rubber and synthetic rubber.
15. The device according to any one of Clauses 9 to 14, wherein:

(a) the magnets of the first and second magnetic parts protrude from the first and second contact surfaces; or
(b) all of the magnets of the first magnetic part protrude from the first contact surfaces and all of the second magnetic parts are recessed into the second contact surface or vice versa; or
(c) some of the magnets of the first and second magnetic parts protrude from the first and second contact surfaces with the remainder are recessed into said surfaces such that the protruding magnets of the first magnetic part meet a complementary magnet protruding from or recessed into the surface of the second contact surface and vice versa.

16. The device according to any one of Clauses 7 to 15, wherein the device further comprises a plurality of first components (e.g. two to ten, such as two to five) and a single second component having a plurality of second magnetic parts, where each of the plurality of second magnetic parts is adapted to couple to one of the plurality of first components or vice versa.

17. The device according to any one of Clauses 7 to 16, wherein the magnets of the first component part are ferromagnetic and the second component part are electromagnetic, or vice versa.

18. The device according to any one of Clauses 6 to 17, wherein the power supply unit comprises a battery and a DC-DC boost converter.

19. The device according to Clause 18, wherein the power supply unit further comprises a switching module adapted to control a number of lighting modes of the light source.

20. The device according to Clause 18 or Clause 19, wherein the power supply unit further comprises an ambient light detector adapted to control the brightness of the light source based upon the ambient light conditions, optionally wherein one or more of the lighting modes of the switching module is controlled fully or in part by the ambient light detector.

21. The device according to any one of the preceding clauses, wherein the textile or fabric is formed into a garment or a bag, optionally wherein when the textile or fabric is formed into a garment, the garment is selected from shorts, socks, T-shirts, trousers, leggings, shirts, caps, footwear and accessories (e.g. head bands, arm warmers, wristbands) uniforms for rescue workers, night patrol, construction or safety wear, winter sports, and mountaineering clothing and gear.

22. The device according to any one of the preceding clauses, wherein the flexible and conformable light source apparatus has a thickness that is less than or equal to 1000 μm (e.g. less than or equal to 750 μm).

23. The device according to clause 22, wherein the flexible and conformable light source apparatus has a thickness that is less than or equal to 350 μm.

24. The device according to clause 22 or clause 23, wherein:
(a) the flexible and conformable light source apparatus has a bending radius of from 0.001 mm to 10 mm (e.g. such as from 0.01 mm to 1 mm, from 1 mm to 10 mm, or less than or equal to 5 mm); and/or
(b) when the flexible and conformable light source apparatus has more than one light source, the distance between the light sources is at least 0.1 cm.

25. The device according to any one of the preceding clauses, wherein the at least one transparent polymer layer is a material selected from one or more of the group consisting of TPU, a silicone-based polymer, a plasma-treated textile substrate and a water repellent textile substrate, optionally wherein the at least one transparent polymer layer is a material selected from one or more of the group consisting of TPU and a silicone-based polymer.

26. The device according to any one of the preceding clauses, wherein the at least one light source is positioned to face towards the textile or fabric, optionally wherein an opening in the fabric or textile aligns with the at least one light source.

27. The device according to any one of Clause 1 to 25, wherein the at least one light source is positioned to face away from the textile or fabric.

28. The device according to any one of the preceding clauses, wherein, when the at least one flexible substrate and textile or fabric define a plane, the flexible and conformable light source apparatus further comprises at least one reflective object adjacent to the at least one light source on said plane and the at least one light source is positioned on the flexible substrate at an angle on said plane such that light generated from the at least one light source is reflected by the at least one reflective object.

29. The device according to Clause 28, wherein the at least one reflective object is a shape selected from the group consisting of a prism, a sphere or part thereof, a concave cup shape, a retroreflective tunnel and one or more fibre optic cables.

30. The device according to any one of Clauses 4 to 29, wherein the flexible substrate is made from one or more of the group selected from polyethylene naphthalate, polyethylene terephthalate, polyimide.

31. The device of any one of the preceding clauses, wherein the device is capable of being washed at least up to 30 times (e.g. at least up to 50 times, such as at least up to 100 times) without affecting the function of the flexible and conformable light source apparatus attached to the textile or garment.

32. The device of any one of the preceding clauses, wherein the at least two conductive members are electrically insulated across their entire length, except at a first portion adjacent to and including the first end and a second portion adjacent to and including the second end, both of which are uninsulated and the first portions of the at least two conductive members are fully encapsulated by the at least one transparent polymer layer.

33. The device of any one of Clauses 21 to 32, wherein the device is part of a garment, then flexible and conformable light source apparatus is located at any position in a garment.

34. The device of Clause 33, wherein the flexible and conformable light source apparatus does not restrict the movement of a wearer of a garment and/or cause the wearer any discomfort.

DRAWINGS

Some embodiments of the present invention are described more fully hereinafter with reference to the accompanying drawings. In the drawing figures, dimensions may be exaggerated for clarity of illustration. Like reference numerals refer to like elements throughout.

FIG. 1 schematically depicts an embodiment of the device of the current invention.

FIG. 2A schematically depicts an embodiment of a further device of the current invention.

FIG. 2B schematically depicts an embodiment of yet a further device of the current invention.

FIG. 2C depicts a substrate 170 that may be used in embodiments of the current invention.

FIGS. 3A-D depict various views of the surface of a first interconnect portion according to an embodiment of the current invention.

FIGS. 4A-D depict various views of the surface of a second interconnect portion according to an embodiment of the current invention.

FIG. 5A schematically depicts a first interconnect portion according to an embodiment of the current invention.

FIG. 5B depicts a connection portion that may be used in embodiments of the current invention.

FIG. 5C schematically depicts a first interconnect portion according to a further embodiment of the current invention.

FIG. 5D schematically depicts the joining of a first and second interconnect portions according to the current invention.

FIG. 6A-C depicts first and second portions of an interconnect according to the current invention, both separately and in combination.

Figure 11:
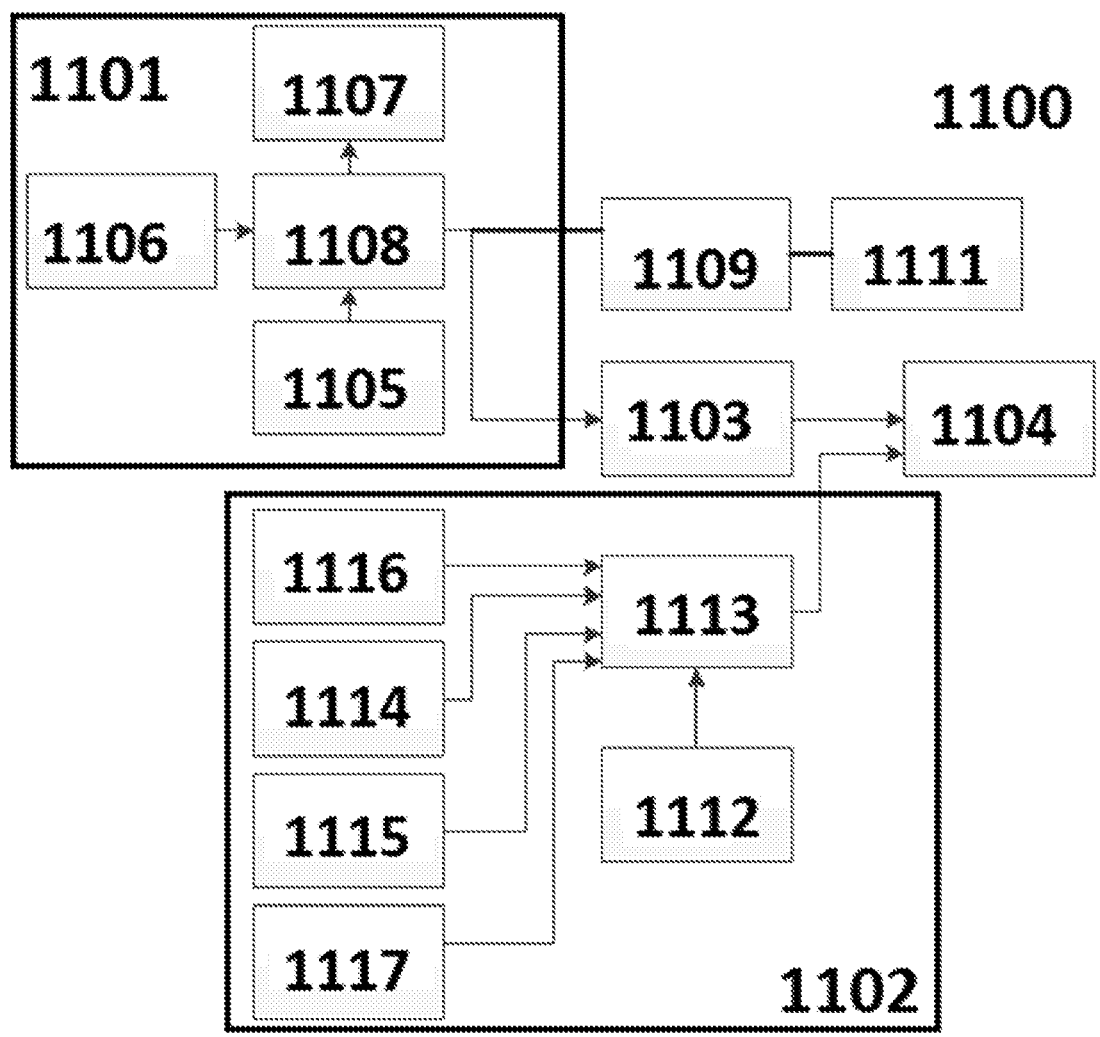

FIG. 11 describes the physical system architecture and interaction of these components in an embodiment of the current invention.

Figure 12:
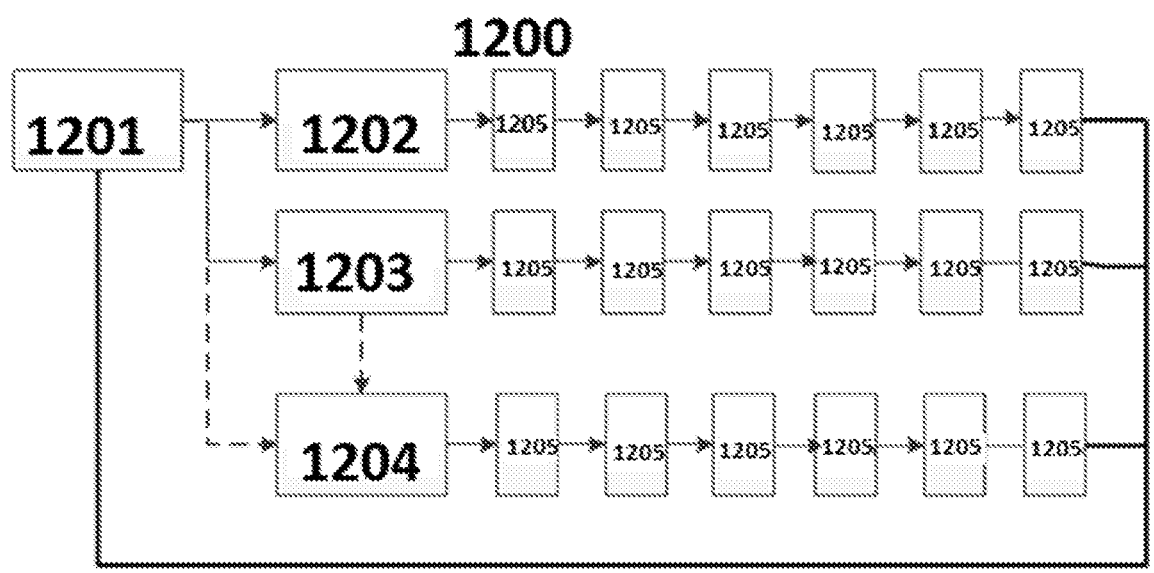

FIG. 12 depicts the lighting module of an embodiment of the current invention.

Figure 13A:
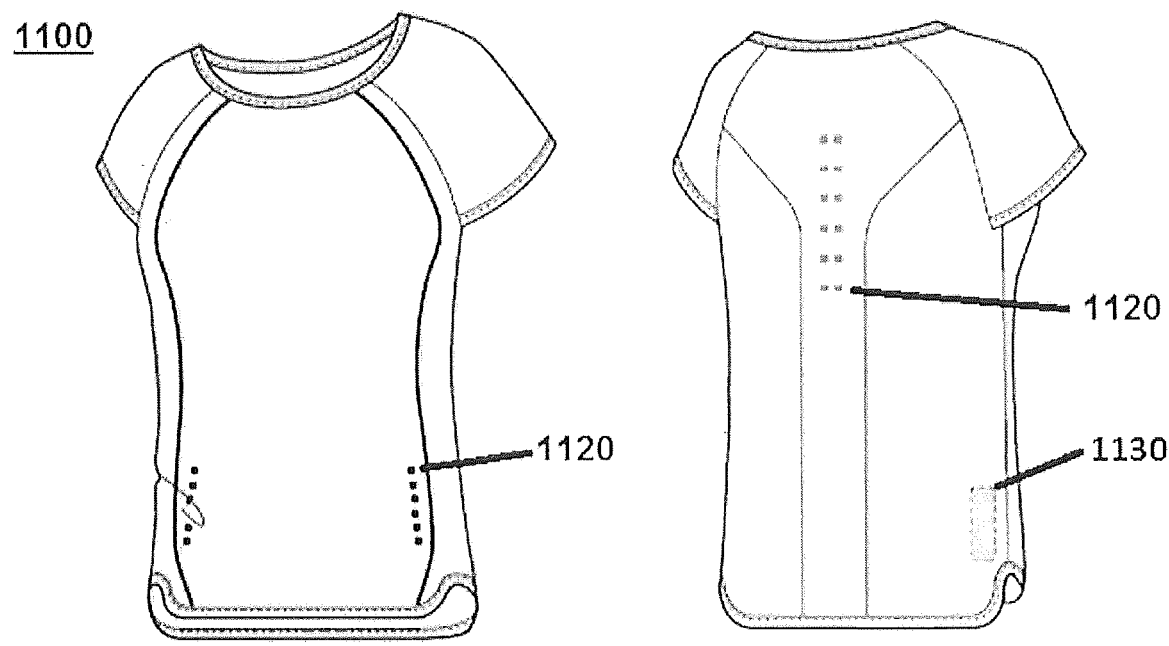
Figure 13B:
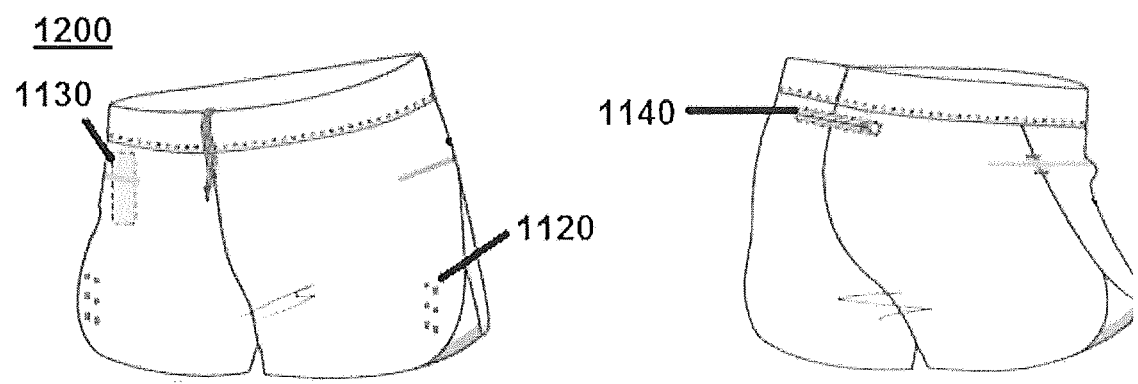

FIGS. 13A and 13B disclose a T-shirt and shorts according to embodiments of the current invention.

Figure 14:
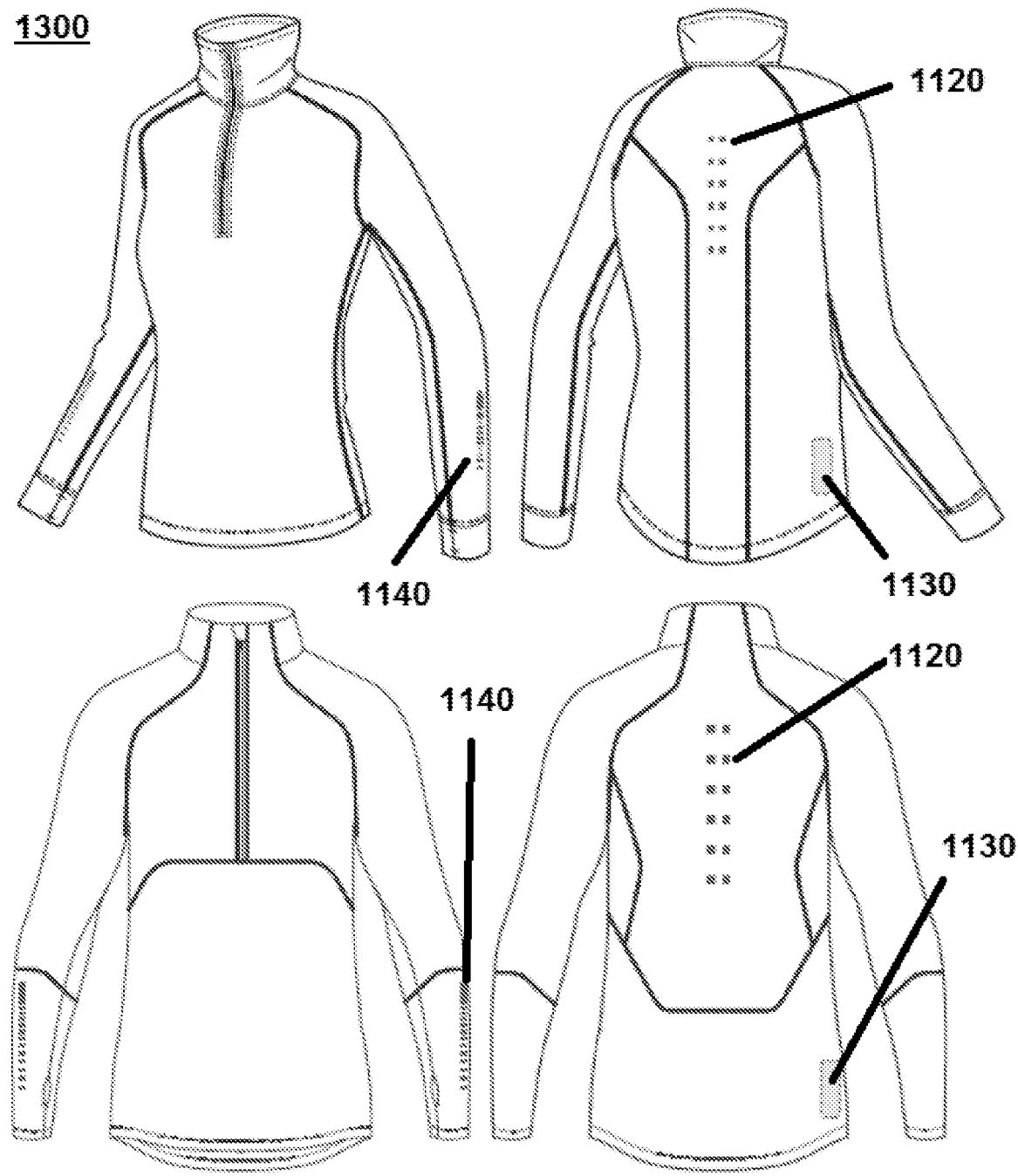

FIG. 14 depicts a long-sleeved shirt 1300 according to an embodiment of the current invention.

FIGS. 15-18 depict the use of a reflective layer in embodiments of the current invention.

DESCRIPTION

The subject matter of the current invention seeks to solve one or more of the problems described hereinbefore with regard to conventional solutions to the issues faced by people who have to venture outside in low-light conditions.

In the following detailed description, only certain embodiments of the present invention have been shown and described, simply by way of illustration. As those skilled in the art would realise, the described embodiments may preferably be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

An important prerequisite for electronics-in-garments is unobtrusive integration. This means that the original textile properties should be preserved even when the electronic functionality has been added to the garment. This means that the electronics have to be very thin and flexible to allow unobtrusive integration. In addition, the garments should withstand routine use and cleaning. This may include hand- or machine-washing and waterless washing (e.g. dry cleaning, self-washing garments etc).

Figure 1:
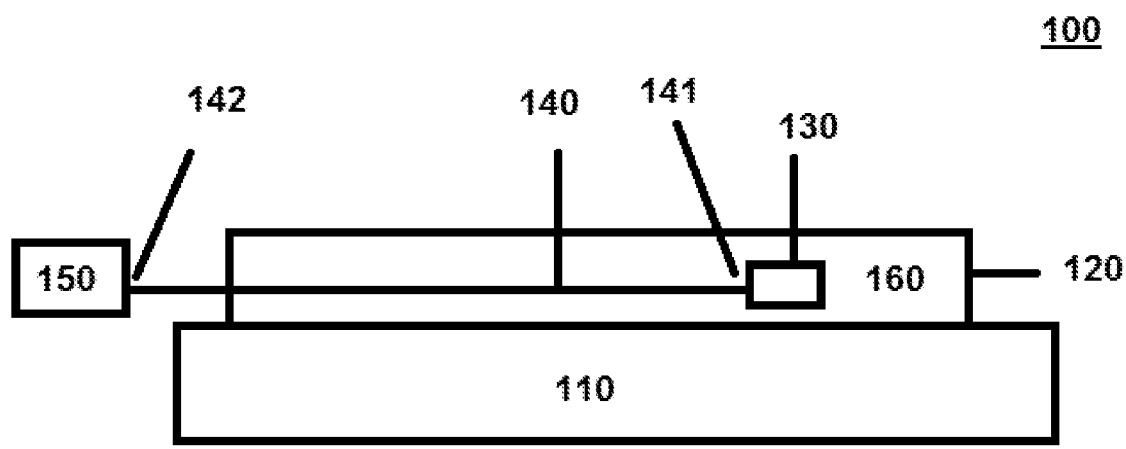

Given this, and as depicted in FIG. 1, the present invention seeks to provide a device 100 comprising:
 a textile or fabric 110; and
 a flexible and conformable light source 120 apparatus attached to the textile or fabric 110, wherein the light source apparatus 120 comprises:
  at least one light source 130;
  at least two conductive members 140 having a first end 141 and a second end 142, the first end is connected to the at least one light source and the second end is adapted to connect to a power source 150; and
  at least one transparent polymer layer 160 that encapsulates the entirety of the at least one light source and at least part of the at least two conductive members.

Advantages associated with this device include the reduced thickness of the device, which results in improved comfort to the wearer of a garment that incorporates said device. That is, the wearer does not feel any impediment on their range of movements or in the feel of the garment caused by the device. A further advantage of the device as described in more detail below is the fact the resulting device is washable (e.g. machine washable with or in the absence of water) multiple times, while still being capable of providing the desired functionality following the washing cycle. Thus, the device provided herein provides a combination of both comfort and durability.

The textile or fabric 110 may be of any suitable material. For example, when the textile or fabric is in the form of a garment, the textile or garment may be made of one or more of any suitable natural or synthetic material (such as nylon, polyester, cotton, rayon, leather, flax, wool, ramie, silk, fur, polyesters, bamboo, jute, hemp, elastane, flannel or blends thereof. These materials may be in the form of woven, knit, non-woven or fibre like structures.

The flexible and conformable light source apparatus 120 may be attached to the textile or fabric 110 in any suitable manner. For example, the light source apparatus 120 may be attached by the use of adhesives, stitching, ultrasonic welding or heat-bonding via the transparent polymer layer 160 to the textile or fabric 110. The light source 130 may be selected from one or more of the group consisting of a light emitting diode (LED), an organic light emitting diode (OLED) and an electroluminescent material. The at least one transparent polymer layer is a material selected from one or more of the group consisting of TPU, a silicone-based polymer, a plasma-treated textile substrate and a water repellent textile substrate (e.g. TPU and/or a silicone-based polymer).

When used herein, "LED" refers to all types of LEDs unless specifically specified otherwise, for example a conventional LED, an OLED and a bipolar LED. As an example where "LED" is restricted in meaning, when the phrase "the group consisting of a neon light source, a light emitting diode (LED), an organic light emitting diode (OLED) and an electroluminescent material" is used it will be understood that "LED" relates to all types of LED except for OLEDs. When used herein, "OLED" refers to all kinds of OLEDs.

In certain embodiments, the light source apparatus 120 may further comprise an optical channelling device (e.g. an optical fibre) to provide additional lighting effects. Additional effects may be obtained by the use of reflective surfaces, as described in relation to FIGS. 15 to 18 below.

When used for illumination purposes, the light source may operate at wavelength visible to the human eye (i.e. from 495-570 nm). In certain embodiments that may be mentioned herein, the light source 130 may have a dominant wavelength of 527 nm. It will be appreciated that other light sources may be used for other purposes. For example, an infra-red light source may be used in a garment to provide heat to treat an injury in a specific body part of a subject. In alternative embodiments, the light source may operate at an ultraviolet wavelength in order to provide a therapeutic or diagnostic effect. These additional uses for light sources will be discussed in more detail hereinbelow.

Figure 2A:
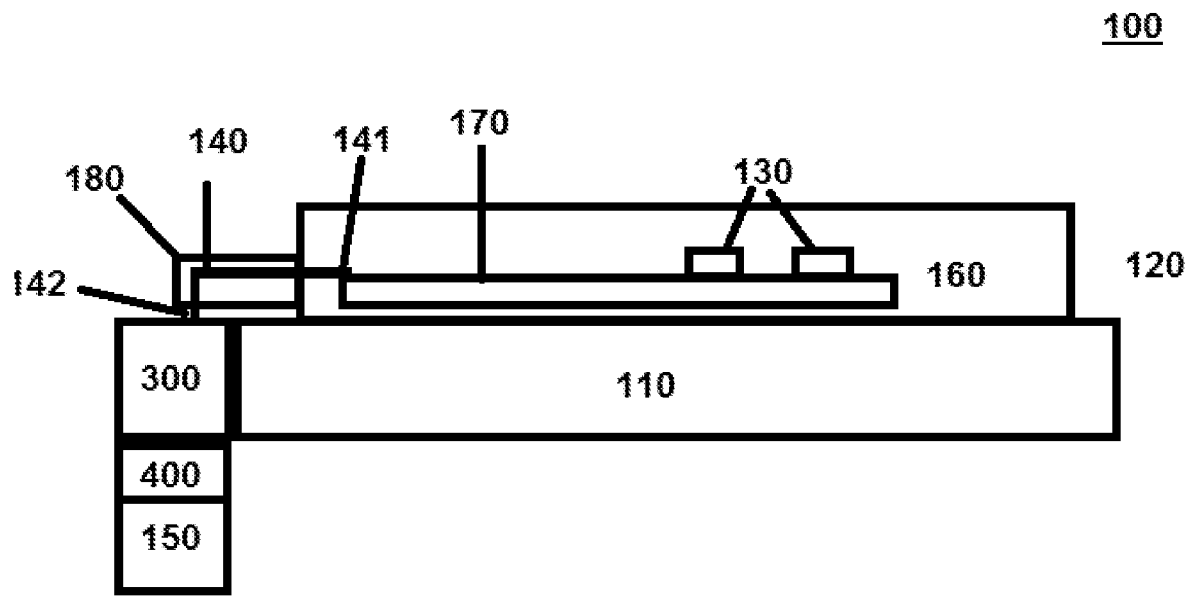

As depicted in FIG. 2A, the flexible and conformable light source apparatus 120 of the device 100 may further comprise at least one flexible substrate 170 (e.g. the flexible substrate is made from one or more of the group selected from polyethylene naphthalate, polyethylene terephthalate and polyimide) with at least one electrical circuit thereon, where the at least one light source 130 (depicted as two lights sources in this embodiment) is attached to the at least one flexible substrate through the at least one electrical circuit (e.g. the attachment may be by use of an isotropic conductive adhesive or by soldering) and the at least one electrical circuit is connected to the at least two conductive members 140 (e.g. the at least two conductive members 140 may be one or more of the group selected from a wire (e.g. silver, copper, stainless steel), a conductive yarn, a screen-printed conductive path (e.g. a conductive paste) and combinations thereof). In certain embodiments, the at least one electrical circuit may comprise silver and/or copper. It will be appreciated that in all aspects and embodiments mentioned herein, the flexible substrate and the electrical circuit thereon are fully encapsulated within the at least one polymer layer.

Figure 6:
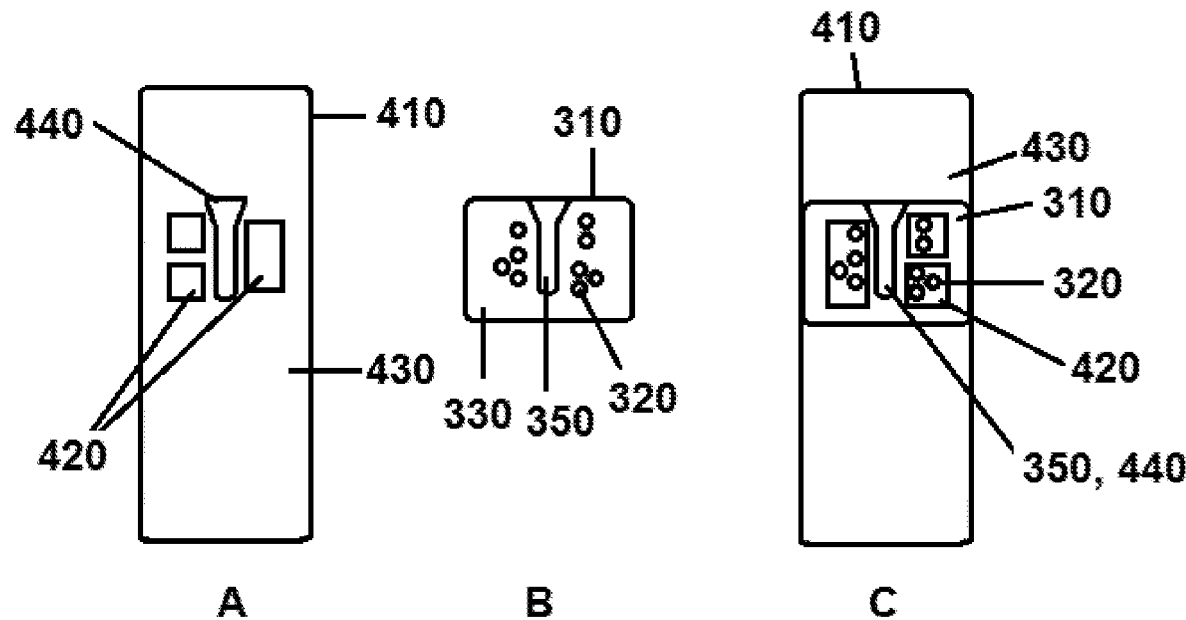

Any suitable conductive yarn may be used in the current invention, provided that there is provided an uninsulated terminal section. In certain embodiments, the entire conductive yarn may be uninsulated, while in other embodiments, the majority of the conductive yarn may be protected by an insulating material. It will be appreciated that the terminal section of the conductive yarn may be provided with an insulating material that is removed from the terminal section of the conductive yarn to provide an uninsulated conductive yarn. This is discussed in more detail in FIG. 6.

When used herein, the term "yarn" is intended to take its ordinary meaning in the art (long continuous length of interlocked fibres, suitable for use in one or more of the production of textiles, crocheting, knitting, weaving, embroidery and, more particularly sewing), though it is expanded herein to also cover the use of single filaments of a material, such as a metallic filament. Thus, the uninsulated conductive yarn may be a thin metal wire (e.g. a metal filament suitable for use in one or more of the production of textiles, crocheting, knitting, weaving, embroidery and, more particularly sewing), a metal yarn (i.e. interlocking metal fibers), a yarn or filament made from a conductive polymer, and a conductive composite yarn.

A number of different kinds of conductive composite yarns exist. A first type of conductive composite yarn comprises a normal non-conductive yarn's fibres as a core material that is impregnated with at least one conductive material, such as a metal or a non-metallic conductive material, which latter material may be provided in part in a polymer matrix. A second type of conductive composite yarn comprises a normal non-conductive yarn's fibres as a core material that is then wound together with one or more filaments/fibres of a metal and/or a non-metallic conductive material. A third type of conductive composite yarn comprises a non-metallic conductive material, such as carbon nanotubes or graphene along with a polymeric material, wherein the non-metallic conductive material may be distributed homogeneously throughout the polymeric material to provide a conductive yarn, or the non-metallic conductive material is aligned to form a yarn, with a polymer dispersed within the spaces created in said yarn (e.g. a continuous superaligned carbon nanotube yarn as a conductive framework with polyvinyl alcohol inserted into the intertube spaces of the framework, as described in Liu et al. *ACS Nano,* 2010, 4 (10), pp 5827-5834).

Metals that may be mentioned in aspects and embodiments of the invention (i.e. in relation to yarns and wires) include, but are not limited to, iron, copper, silver, gold, aluminium, brass, titanium, and platinum and alloys thereof. For example, a metal alloy that may be mentioned herein is stainless steel.

It will be appreciated that when more than one conductive yarn is used in embodiments of the invention, they may be made of the same material or of different materials. For example, silver coated yarns, stainless steel coated yarns, copper wires, and silver wires may all be used in conjunction in certain embodiments of the invention.

When used herein, the term "electrical circuit" may relate to a printed circuit (e.g. a screen-printed circuit) or by lithographic etched circuit (e.g. a lithographically etched copper circuit).

FIG. 2A also depicts the use of an electrical interconnect 300, 400 to connect the power source 150 (e.g. a power supply unit) to the light source apparatus, such that the power source is easily detached from the garment and/or textile. As shown, second ends 142 of the conductive members 140 interface with the interconnect portion 300 attached to the garment 110. In order to reduce the exposure of the conductive members 140, the majority (or all, as described below) of the wiring that is not encapsulated within the polymer layer 160 may be encapsulated, for example through the use of an additional polymeric component 180 (which may be of the same material described in respect of the polymer layer 160) to help protect the conductive members 140 from exposure to the environment.

Alternatively or additionally, the exposed wires may be surrounded by an additional textile layer, so as to provide additional comfort to the wearer, while also providing electrical insulation. It will be understood that a portion of the conductive members 140 are left unencapsulated so as to enable engagement into the interconnect portion 300, though any remaining exposed wiring is covered (e.g. as described above) once the connection to the interconnection portion 300 has been established. The power source 150 also further comprises an interconnect portion 400 to enable transfer of power from the power source to the flexible and conformable light source apparatus 120.

Figure 2B:
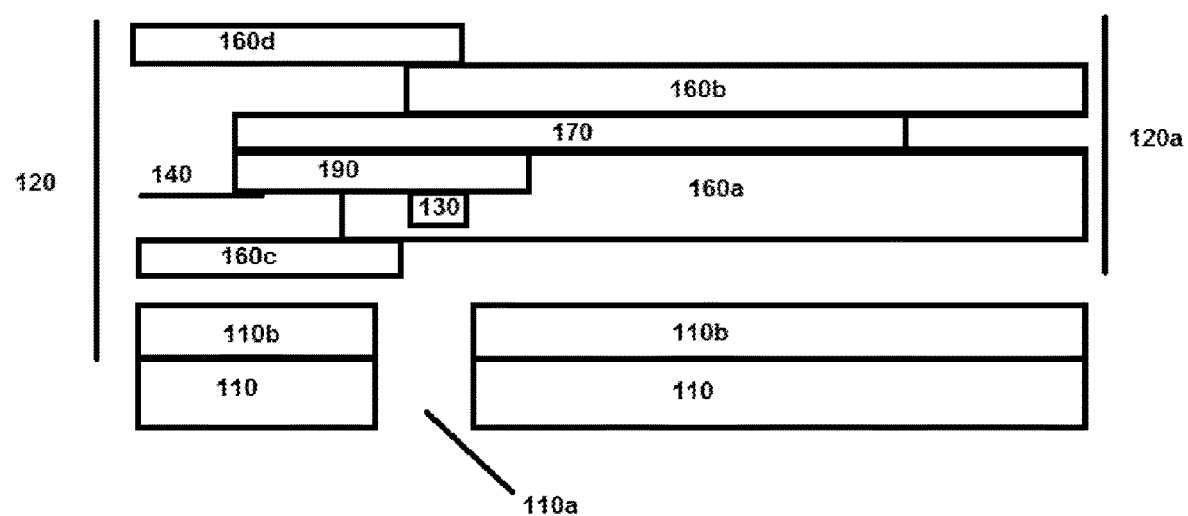

FIG. 2B depicts a further embodiment of the flexible and conformable light source apparatus 120, when attached to a garment 110, where the light source 130 faces away from the body of a wearer. It will be appreciated that such an arrangement may be useful for improving the visibility of a wearer of a garment that comprises the flexible and conformable light source apparatus 120, when the light source provides a visible light. It will also be appreciated that if the number and/or intensities and/or wavelength of the visible light is adjusted, the flexible and conformable light source apparatus may also be used to provide illumination to the wearer of the garment (e.g. cyclists and runners), such that the wearer's path is illuminated. This may be used to provide a short- to long-distance illumination and may include the path in front of the wearer, as well as illumination to the sides and back of the wearer, depending on the application in question. In addition, it will be appreciated that such devices (in common with others discussed herein, may generate an amount of heat that leads to an increase in the surface temperature of at least the skin layer of the wearer, thereby helping to keep the wearer warm. This may be beneficial for a wearer facing inclement weather, or to a user who has an injury to a muscle and is in need of heat therapy.

As shown in FIG. 2B, the flexible substrate 170 (e.g. a PEN substrate) is attached to the light source 130 by way of a silver conduction pad 190, with the light source 130 being bonded to the surface of the conduction pad 190 by an isotropic conductive adhesive. In addition, the silver conduction pad 190 of this embodiment is in conductive contact with the conductive member 140. As shown, the flexible and conformable light source apparatus 120 is encapsulated in a number of layers of encapsulating polymer (160a-d). Although not necessary, a hole 110a can be cut into the fabric 110 to enhance the light emitted from the light source to the outside world (combinations of light sources covered and light sources that are exposed by holes 110a are contemplated). Further, to enhance the bonding of the light source apparatus 120 to the fabric, an additional polymer layer (e.g. made of the same materials previously described for polymer layer 160) may be used. In this embodiment, the polymeric layer 110b is heat-bonded to the fabric 110 and the light source apparatus 120 is then heat-bonded to the polymeric layer 110b. It will be appreciated, that a single layer of unbroken polymer may be heat-bonded, with a hole then being cut through the fabric to generate hole 110a. Alternatively, hole 110a may be generated first, followed by heat bonding two separate polymer layers 110b to either side of hole 110a. In certain cases, the hole 110a may be sealed with a different material, such as a transparent TPU or silicone. In certain embodiments, a combination of light sources facing away from the body is also contemplated, where some of the light sources are covered by the original material, some are exposed by holes 110a and some are exposed by holes 110a, but which holes are sealed with a different material (e.g. TPU or silicone). Further, it will be appreciated that the component layers of 120a may be inverted so that the light source 130 faces towards the wearers skin instead. In this arrangement, hole 110a may be absent.

In order to reduce the size of the device, and ensure a suitable bending radius (e.g. less than or equal to 5 mm), the flexible light source is kept as thin as possible (e.g. less than or equal to 350 µm). To accomplish this, the flexible substrate 170, polymer layers 160b-d and polymer layers 110b may have a thickness of 75 µm, while polymer layer 160a may have a thickness of 160 µm. In alternative embodiments of the invention, the flexible and conformable light source apparatus may have a thickness that is from 350 µm to 650 µm. This may be achieved by the use of a number of layers of polymer layer on either side of the light source, such as a first polymer layer of 75 µm and a second polymer layer of 150 µm thickness on a first side of the light source and a third polymer layer of 150 µm and a fourth polymer layer of 75 µm thickness on the other side of the light source, where these polymer layers form the at least one encapsulating layer (in alternative embodiments of this arrangement, the first and fourth polymer layers of 75 µm thickness may be replaced with polymer layers having 150 µm thickness and/or the second and third polymer layers of 150 µm thickness may be replaced by polymer layers of 125 µm thickness). In addition, the flexible and conformable light source apparatus may have a bending radius of from 0.001 mm to 10 mm (e.g. such as from 0.01 mm to 1 mm, from 1 mm to 10 mm, from 2 mm to 6 mm, such as 5 mm or less). These arrangements may provide the light source (e.g. an LED or an OLED) with impact protection and enable the flexible and conformable light source apparatus to survive washing. For example, such a garment may be capable of being washed at least up to 30 times (e.g. at least up to 50 times, such as at least up to 100 times) without affecting the function of the flexible and conformable light source apparatus attached to the textile or garment. While the above arrangements are described in the context of FIG. 2B, it will be appreciated that they are generally applicable within all aspects and embodiments of the current invention.

FIG. 2B depicts the use of a number of encapsulating layers (160a-d), which are applied individually or in a paired manner (e.g. 160a and 160b; and 160c and 160d). This arrangement may be caused by the separate introduction of the interconnect 190 and conductive member 140. In order to simplify the production and also to improve the water-resistance and strength of the product, in certain embodiments of the invention al essential components are assembled together and are then encapsulated in a single operation. In addition, and as described herein, the encapsulation may involve a single layer of material or multiple layers. When the essential components have been assembled as a single unit before encapsulation, the encapsulation may involve more than one layer on each side of the assembly to be encapsulated. This may help to improve water resistance and also the mechanical strength of the resulting device.

Figure 2C:
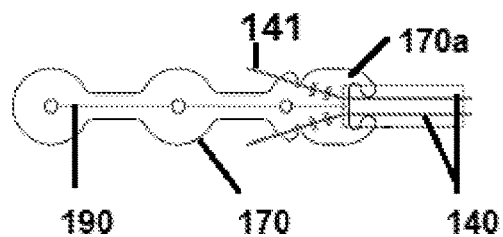
Figure 3:
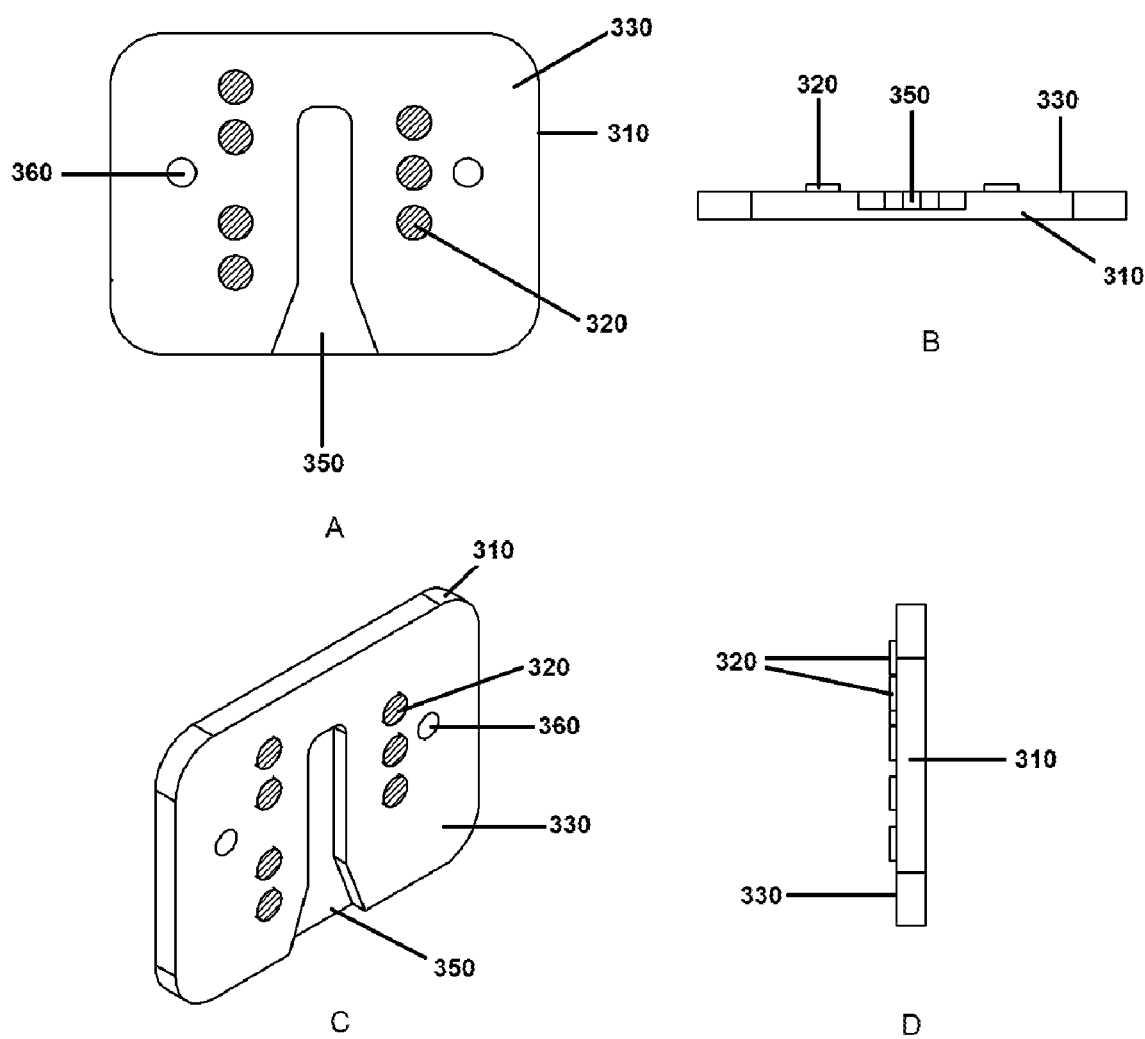
Figure 4:
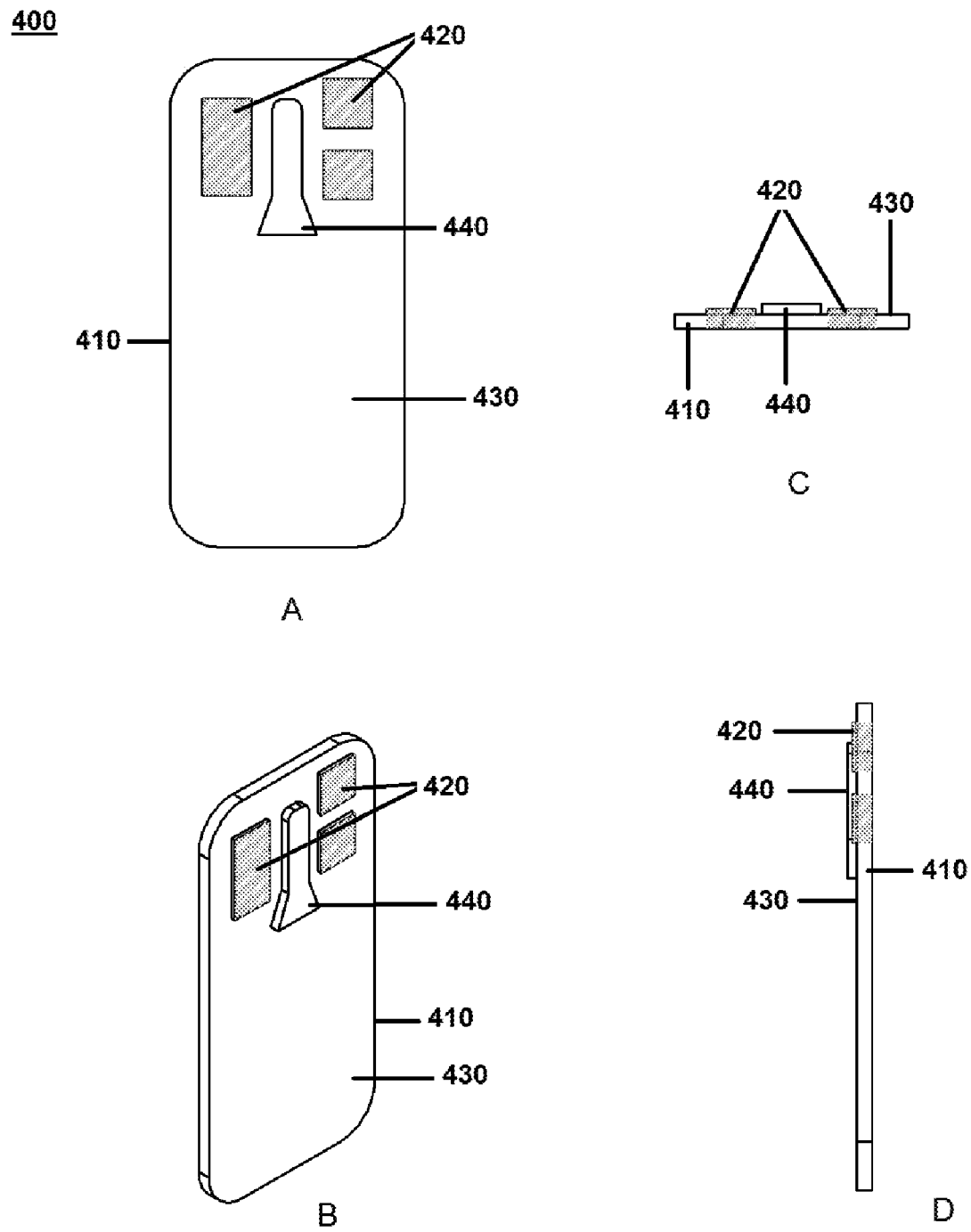

FIG. 2C depicts a flexible substrate 170 according to an embodiment of the current invention. Flexible substrate 170 may be made from one or more of the group selected from polyethylene naphthalate, polyethylene terephthalate and polyimide. An electrical circuit depicted schematically by 190 is applied to the surface (e.g. by printing the circuitry or by lithographically patterning a circuit), where the circuitry may comprise silver and/or copper and then the light source 130 (not shown) is attached to the flexible substrate (e.g. by use of an isotropic conductive adhesive or by soldering, optionally followed by underfilling of the light source. The flexible substrate is then die cut or patterned (e.g. by laser cutting) to provide the final form factor shown, which uses a lobstered shape to engage with the first ends 141 of the two conductive members 140. It will be appreciated that any other suitable means of engaging the conductive members 140 may be used. As shown, the first ends 141 of the two conductive members 140 subsequently are placed into conductive contact with the electrical trace 190 to enable illumination of the light source.

In additional or alternative embodiments, the flexible and conformable light source apparatus may have a thickness that is less than or equal to 1000 µm. For example, the flexible and conformable light source apparatus may have a thickness of less than or equal to 750 µm, such as less than or equal to 350 µm. In addition, the flexible and conformable light source apparatus may have a bending radius of less than or equal to 5 mm. When the flexible and conformable light source apparatus has a thickness that is less than or equal to 350 µm, the device may be particularly comfortable to wear as part of a thin garment (e.g. a single-layer t-shirt, shirt etc), this comfort may be further improved when the flexible and conformable light source apparatus also has a bending radius of less than or equal to 5 mm.

Thicknesses for the flexible and conformable light source apparatus that may be mentioned herein include a thickness of from 400 μm to 650 μm or from 200 μm to 300 μm. Bending radii for the flexible and conformable light source apparatus that may be mentioned herein are from 0.001 mm to 10 mm, such as from 1 mm to 10 mm or from 2 to 5 mm.

In certain aspects and embodiments of the invention, the total thickness of the device may be from 700 μm to 2 mm. It will be appreciated that the lower range may be particularly suitable for use in athletics wear, while the higher end of the range may be suitable for use in the manufacture of a garment/device where a thick layer of fabric may be useful (e.g. a jacket). Particular thicknesses that may be mentioned herein include, but are not limited to from 700 μm to 1,500 μm, such as from 800 μm to 1,500 μm.

The electrical interconnect may be any suitable electrical interconnect, provided that the interconnect is capable of enabling power to be transferred from a power source to the light source(s), such that illumination of the light sources is accomplished. For example, this may relate to a standard plug and socket arrangement, a releasable snap-fit connector with male and female component parts, or conductively connectable (and releasable) metal rivets. Alternatively, the electrical interconnect may contain a flexible arrangement comprising an electrical contact surface adapted to be attached to a power source with a complementary electrical contact surface.

In certain embodiments of the invention, the electrical interconnect 300/400 may comprise:
  a first flexible interconnect component that is attached to the textile or fabric and to the second end of the at least two conductive members, comprising:
  at least one first magnetic part; and
  a first housing having a first contact surface, the first housing being adapted to securely hold the at least one first magnetic part, such that the at least one first magnetic part protrudes from the first contact surface and/or forms a recess in said surface; and
  a second flexible and/or rigid interconnect component that is attached to the power supply unit, comprising:
  at least one second magnetic part; and
  a second housing having a second contact surface, the second housing being adapted to securely hold the at least one second magnetic part, such that the at least one second magnetic part protrudes from the second contact surface and/or forms a recess in said surface, wherein,
  the at least one first and the at least one second magnetic parts are complementarily positioned in the first and second housings, respectively, to enable coupling of the first and second contact surfaces through magnetic interaction;
  electricity and/or signalling data is conducted through the first and second magnetic parts when coupled;
  the at least first and at least second magnetic parts protrude from and/or are recessed into the first and second contact surfaces by from 10 μm to 500 μm (e.g. from 25 μm to 250 μm, such as 100 μm).

FIGS. 3A-D depict various views of a first flexible interconnect component 300 according to an embodiment of the present invention. FIGS. 4A-D depict various view of a second (in this case rigid) interconnect component 400 that may be used in conjunction with the flexible component 300 depicted in FIGS. 3A-D. Hereinafter, the electrical interconnector composed of the flexible 300 and rigid 400 parts will be described with reference to FIGS. 3 and 4.

As shown in FIGS. 3A-D, the electrical connector comprises a first component 300 that is flexible which contains a first housing 310 and seven magnets 320, where the first housing 310 has a contact surface 330 and is adapted to securely house the magnets 320, so that at least part of the magnets 320 protrude from the first contact surface by from 10 μm to 500 μm (as shown most clearly in FIGS. 3C and D). As shown in FIGS. 3A, 3C and 3D, the first component is flexible, which allows the first contact surface to adopt a range of configurations, for example, the contact surface may have a substantially planar, curved or wave-type (e.g. as shown in FIG. 3D) configuration.

The first housing 310 may be made from one or more of a material selected from the group consisting of leather, a synthetic leather, a rexine, silicone, a hard fabric, flexible polyurethane, polyethylene napthalene, urethane, TPU, natural rubber and synthetic rubber.

As depicted in FIGS. 3A-D, the magnets may have a cylindrical shape, so as to present a circular shape on the contact surface 330, though any other suitable configuration is possible.

For example, the magnets may also be rectangular cuboid or cube-shaped, so as to present a rectangular or square shape, respectively, on the contact surface 330. Combinations of these shapes are also possible.

The magnets 320 may simply be a shaped block of a magnetic material (e.g. ferromagnetic material or a rare-earth magnet) or they may comprise a magnet core surrounded by a non-magnet, conductive outer shell. For example, the conductive outer shell may be one or more of a material selected from aluminium, copper, lead, nickel, tin, titanium, zinc, gold, silver, platinum, cobalt, lithium, tungsten, beryllium, bismuth, cerium, cadmium, niobium, indium, gallium, germanium, selenium, tantalum, tellurium, vanadium, zirconium and iron. When present, the magnet core may be any ferromagnetic material (e.g. a rare earth magnet) that has been magnetised or an electromagnet (e.g. conductive coils wrapped around/through a paramagnetic material).

Ferromagnetic materials that may be mentioned herein include iron, cobalt, nickel, alnico bismanol, chromium(IV) oxide, dysprosium, fernico, gadolinium, gallium manganese arsenide, heusler alloy, magnetite, metglas and MKM steel.

As depicted in FIGS. 3A-D, the total surface area of the magnets 320 compared to the total surface area of the entire first contact surface 330 (including the magnets) is approximately 7.2%. In alternative embodiments, the total surface area of the magnets 320 compared to the total surface area of the entire first contact surface 330 may be from 4.5% to 90.0% (e.g. from 4.5% to 50.0%, from 5% to 40%, such as from 7% to 30%, such as from 8% to 25%).

As depicted in FIGS. 3B-D, the first housing 310 has a depth substantially perpendicular to the first contact surface 330. To hold the magnets 320 in place, each housing contains a hole for each magnet (not shown), where the hole is adapted to securely hold the magnet. For example, this may be achieved by: gluing the magnets 320 to the first housing 310 with back plates that are attached to the magnets 320 and which back plates are larger than the hole; having one or more grooves in the magnets 320 that fit (e.g. snap-fit) with a corresponding projection in the first housing 310; tapering the magnets 320 and the first housing 310 in an axial direction; or tight-fitting the magnets to housing. The holes are substantially perpendicular to the first contact surface 330 and extend from the first contact surface to the opposite side of the housing (i.e. the holes are through holes). This arrangement allows the magnets to be in direct contact with a conductive material. In an alternative configuration, the holes in the first housing may be a blind hole having at least one wall, where the at least one wall further comprises an aperture suitable for a flexible conductive member (e.g. a wire). It will be appreciated that each hole is independent and so the first housing may contain a combination of such arrangements.

The first flexible component 300 of FIGS. 3A-D also contains a rivet holes 360 and a groove 350 in the housing that are situated between the magnets 320. The rivet holes 360, enable the flexible component to be fixed to an object (e.g. a garment) and may positioned in any suitable part of the flexible component. The groove segment may be as flexible as the rest of the flexible component. However, in certain embodiments, sections of the flexible component containing grooves may be less flexible than the remainder of the flexible component. It will be appreciated that these sections retain a degree of flexibility and are not rigid.

Figure 5A:
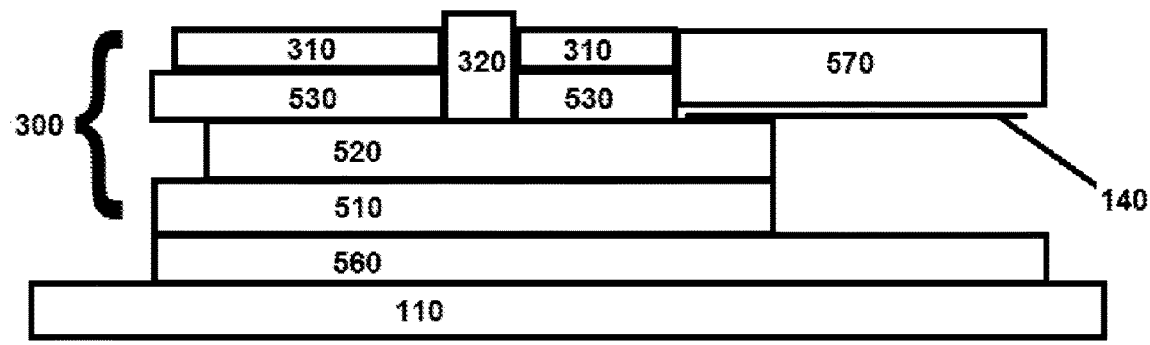

FIG. 5A helps to illustrate the flexible component as part of a garment or textile/fabric 110. In FIG. 5A, the flexible component 100 comprises a number of flexible layers (510-530) that are bonded to a layer of fabric 110, which may be the body the garment by way of a polymeric layer 560 (e.g. made from a thermoplastic polyurethane) that acts as a barrier material to insulate the electrical components of the flexible component 300 from environmental factors (e.g. sweat and body fluids from the body of the wearer), while helping to insulate the wearer from the electrical current produced by the device in operation. In this embodiment, the flexible component part 300 contains a flexible base layer 510 (e.g. made from poly(ethylene 2,6-naphthalene dicarboxylate); PEN) onto which is bonded a flexible layer of silver 520 (e.g.

a screen-printed layer of silver), which provides the conductive and/or data connectivity in this embodiment. The silver (or copper) layer 520 is in direct conducting contact with the magnets 320 of the first flexible component 300, as well as two or more conductive wires 140 that extend laterally from the surface of the silver layer 520. As shown, the magnet(s) 320 are situated in a hole through two layers of the first component 300, an electrically insulating layer 530 (e.g. made from a thermoplastic polyurethane) and the first contact surface layer 310, which may be made of any of the materials described above. To help protect the conductive wires 140, a further layer of an insulating polymer 570 may be laid on top of it to encapsulate and protect it and the silver layer 520 from environmental factors (the encapsulating being achieved in combination with the other insulating layers 530 and 560. It will be appreciated that the wire 140 may be encapsulated in an insulating material over its entire length, except for the terminus, which is in conductive contact with an electrical device or sensor as described herein. In certain embodiments, the first flexible component may also be encased in a covering of fabric attached to the layer of fabric 550 to form a pocket suitable to house the first flexible component and the second component. This arrangement is advantageous when the second component incorporates a power supply unit.

Figure 5B:
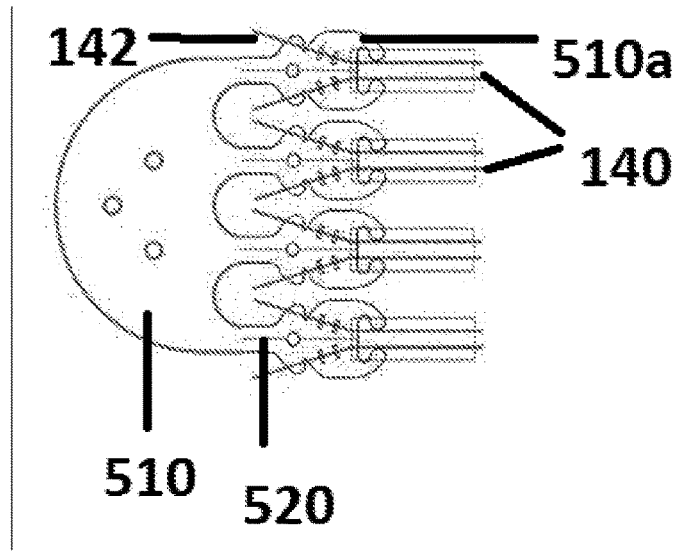
Figure 5C:
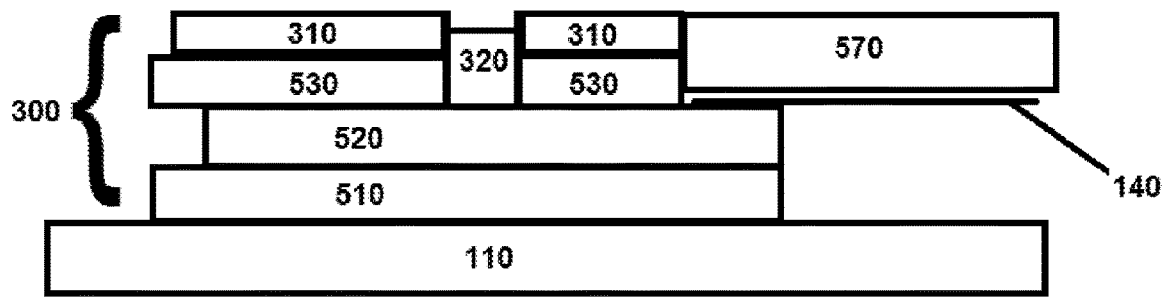
Figure 5D:
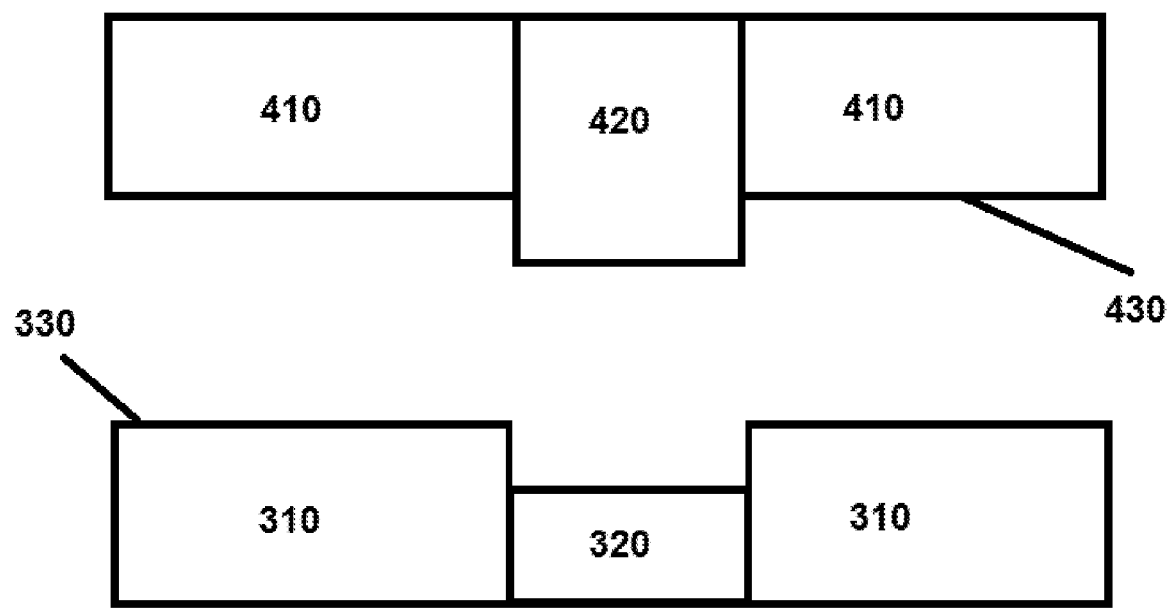

FIG. 5C depicts a further embodiment of the current invention. In contrast to FIG. 5A, insulating layer 560 is not present and the magnet 320 is contained in a recess within the first contact surface 330 (e.g. see FIG. 3A and FIG. 5D). In this arrangement, the second contact portion 410 will have a magnet 420 that protrudes from the surface of the contact surface 43, such that it can magnetically connect to magnet 320. This may mean that the protrusion of magnet 420 has a height that matches the depth of the recess of magnet 320, although in particular embodiments, the height may be greater than the depth (e.g. from 1 to 10 μm greater). This is depicted schematically (and in cross-section) in FIG. 5D.

FIG. 5B depicts the base layer 510 and silver (or copper) layer 520 that may be used to distribute electricity from the first interconnect component 300 to the flexible light apparatus 120 (e.g. in the embodiments of FIG. 5A or 5C). As shown, the base layer and conductive layering are cut into a defined shape to enable the distribution of power through multiple conductive members 140. The construction and shaping of these layers may be conducted using the techniques discussed in respect of the flexible substrate 170 hereinbefore.

While FIG. 5A relates to the use of magnets, the layers of material illustrated therein may also be suited to the use in alternative potential interconnects. For example, the flexible connection component 300 may relate to a male snap-fit portion of an electrical interconnect that comprises a number of flexible layers (510-530) that are bonded to a layer of fabric 110, which may be the body the garment by way of a polymeric layer 560 (e.g. made from a thermoplastic polyurethane) that acts as a barrier material to insulate the electrical components of the flexible interconnection component 300 from environmental factors (e.g. sweat and body fluids from the body of the wearer), while helping to insulate the wearer from the electrical current produced by the device in operation. In this embodiment, the flexible interconnection component 300 contains a flexible base layer 510 (e.g. made from poly(ethylene 2,6-naphthalene dicarboxylate); PEN) onto which is bonded a flexible layer of silver 520 (e.g. a screen-printed layer of silver), which provides the conductive and/or data connectivity in this embodiment. The silver (or copper) layer 520 is in direct conducting contact with a male snap-fit conductive member 320, that is arranged to reversibly mate with a female snap-fit conductive member (not shown), as well as two or more conductive wires 140 that extend laterally from the surface of the silver layer 520. As shown, the male member 320 is situated in a hole through two layers of the a flexible interconnection component 300, an electrically insulating layer 530 (e.g. made from a thermoplastic polyurethane) and a first contact surface layer 310, which may be made of any of the materials described above.

While the female snap-fit member is not shown, it will be appreciated that this may be housed on an interconnection component that contains additional electrical components, such as a power supply unit, and may be rigid or flexible. It will be appreciated that any suitable interconnection arrangement may be used herein. The primary purpose of the interconnection arrangement is to provide a coupling that enables power from a removable power supply unit to be supplied to the visibility-enhancing device of the current invention.

As shown in FIGS. 4A-D, the electrical connector comprises a second component 400 that is rigid which contains a second housing 410 and three magnets 420, where the second housing 410 has a contact surface 430 and is adapted to securely house the magnets 420, so that at least part of the magnets 420 protrude from the second contact surface by from 10 μm to 500 μm (as shown most clearly in FIGS. 4C and D). The second component 400 is rigid and provides a planar contact surface 430, and is made from a non-conductive, rigid material typically used in the art, such as, but not limited to such as plastic, wood, metals with non-conductive shielding. In alternative embodiments, the second component may also be flexible and when it is, the second housing may be made of the same materials discussed above for the first housing.

The second component interconnect 400 of FIGS. 4A-D also contains a projection 440 that is complementary in shape (and, optionally size) to the groove 350 in the first component part of FIGS. 3A-D. As shown, the projection 440 extends from the surface of the second contact surface 430.

The magnets 420 depicted in FIGS. 4A-D have a rectangular cuboid shape and are positioned to complement the magnets in the first component 300. The magnets 420 may be made from the same materials as magnets 320 of the first component 300 (e.g. they may also comprise a magnetic core surrounded by a conductive outer shell). Again, as for the magnets 320, the magnets 420 may also take any other shape. As shown, it is not necessary for the magnets of the first and second components to be identical in number or shape, though it is necessary for them to be positioned complimentary to each other. It is not necessary for the magnets to have approximately the same surface area to enable the interconnection to function.

As depicted in FIGS. 4A-D, the total surface area of the magnets 420 compared to the total surface area of the entire second contact surface 430 (including the magnets) is approximately 7.2%. In alternative embodiments, the total surface area of the magnets 420 compared to the total surface area of the entire second contact surface 430 may be from 4.5% to 50.0% (e.g. from 5% to 40%, such as from 7% to 30%, such as from 8% to 25%).

The holes (not explicitly shown) that securely hold the magnets 420, have essentially the same configuration as described for the holes in the first housing (e.g. the holes may be through-holes or blind holes having at least one wall, where the at least one wall further comprises an aperture suitable for a flexible conductive member).

As shown in 3A-D and 4A-D, the magnets 320, 420 are complimentarily positioned in the first 310 and second 410 housings, respectively, to enable coupling of the first and second contact surfaces 330, 430 through magnetic attraction of the magnets 320, 420. It will be appreciated that the magnets 320, 420 have complementary polarities, so as to ensure magnetic attraction. For example, the magnets 320 have a north polarity, with the magnets 420 having a south polarity. Alternatively, one of the magnets 320 may have a north polarity, while the other has a south polarity, with the magnets 420 on the second component 400 having polarity that complements the magnet that it is intended to connect with.

The magnets 320, 420 enable the coupling of the first 300 and second 400 components. Further, when the first component is attached to a first device and the second component is attached to a second device, the magnets 320, 420 are also responsible for conducting electricity and/or signalling data from the second device to the first device, or, in the case of data, vice versa. The ability to conduct electricity and/or signalling data through the magnetic parts of the devices of the current invention removes the need for additional male and female components to provide conductive functionality and therefore reduces the chances of the device being damaged in use. Further, this arrangement also removes the need to have additional moving components that increase the size and complexity of the device (e.g. springs to enable better connection of the male and female components).

The device depicted in FIGS. 3A-D and FIGS. 4A-D contains magnets 320, 420 that are held in position by a through-hole in the respective housing to which they are attached. This arrangement is particularly suitable for direct attachment of the magnet to a printed circuit board (which is flexible) or to a wire, said conductive elements being in conductive contact with the respective devices. Any suitable combination of a printed circuit board and wire is contemplated by the current invention. In embodiments where at least some of the holes are blind holes, the blind holes comprise at least one wall that has an aperture suitable to enable a flexible conductive conduit (e.g. a wire) to come into direct contact with the magnet 320, 420 and so enable the conduction of electricity/data. As will be appreciated, any suitable combination of through- and blind-holes are explicitly contemplated by the current invention.

A major advantage associated with embodiments of the flexible connector described herein is that one does not have to obtain a precise alignment of the component parts before attempting to connect the parts together, as the magnets 320, 420 have the ability to enable self-alignment of the component parts when brought into magnetic proximity to one another (e.g. the components can be up to 5 mm out of alignment with one another). This reduces the chances of the connection device being damaged. A related advantage is that, as one of the components is flexible, said components have the freedom to move and the magnets may respond by moving slightly to retain the self-alignment and electrical/signalling conductivity. Further, as the magnets 320, 420 only protrude slightly from the surface of their respective contact surfaces 330, 430, the connection presents a flat surface and is much thinner than conventional connectors, which require much larger designs to accommodate the male and female components used for electrical conductivity.

FIGS. 6A and 6B depict a rigid component according to FIGS. 4A-D and a flexible component similar to the component depicted in FIGS. 3A-D, respectively. In FIG. 6A, the rigid component 410 has a first contact surface 430, a projection 440 and magnets 420 that are arranged to be complementary to the magnets 320, groove 350 and first contact surface 330 of the flexible component 310 depicted in FIG. 6B. FIG. 6C depicts the joining of said flexible 300 and rigid 400 components schematically and shows that the smaller and more numerous magnets 320 of the first component 300 are arranged to bind to the larger, but less numerous magnets 420 of the second component 400 and the groove 350 holds the projection 440.

The power supply unit may be any suitable power supply unit that can connect to the lighting module attached to the textile/fabric or garment. In certain embodiments, the power supply unit may comprise a battery and a DC-DC boost converter. In further embodiments, the power supply unit may further comprise a switching module adapted to control a number of lighting modes of the light source. In yet further embodiments, the power supply unit may further comprise an ambient light detector adapted to control the brightness of the light source based upon the ambient light conditions (e.g. wherein one or more of the lighting modes of the switching module is controlled fully or in part by the ambient light detector).

Alternatively or additionally, the brightness of the device may also be controlled by:
  (a) a proximity sensor to control the brightness depending on the closeness to an object; and/or
  (c) a sound detector to control the brightness depending on the ambient volume; and/or
  (d) a temperature sensor to control the brightness depending on the temperature.

It will be appreciated that the mode selector may make use of none, one or a combination of the above sensors and the light detector (e.g. light dependant resistor) to control the brightness of the light sources.

Figure 7A:
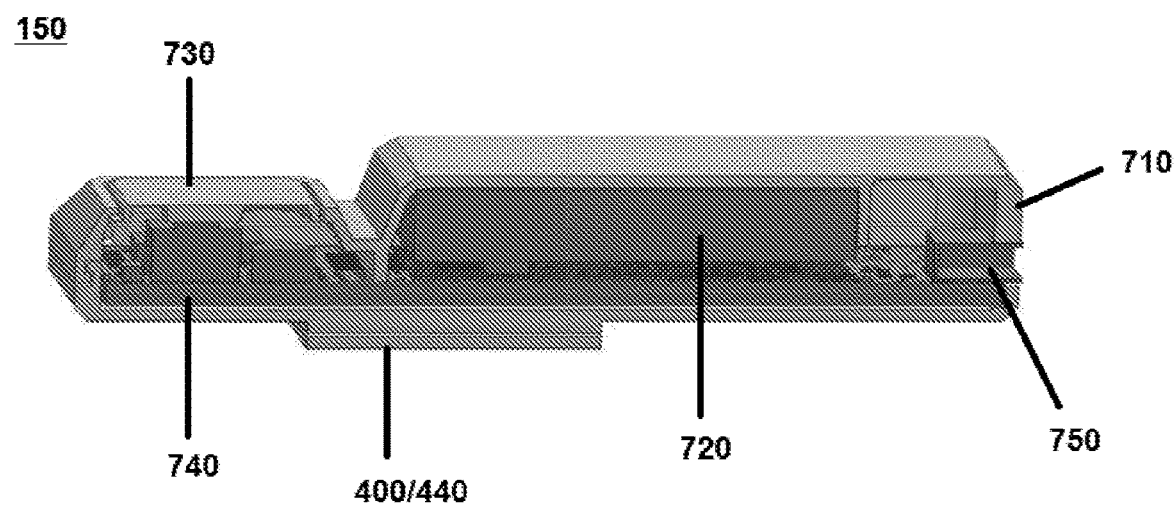
FIG. 7A depicts a cross section of a power supply unit according to the current invention.
Figure 7A:
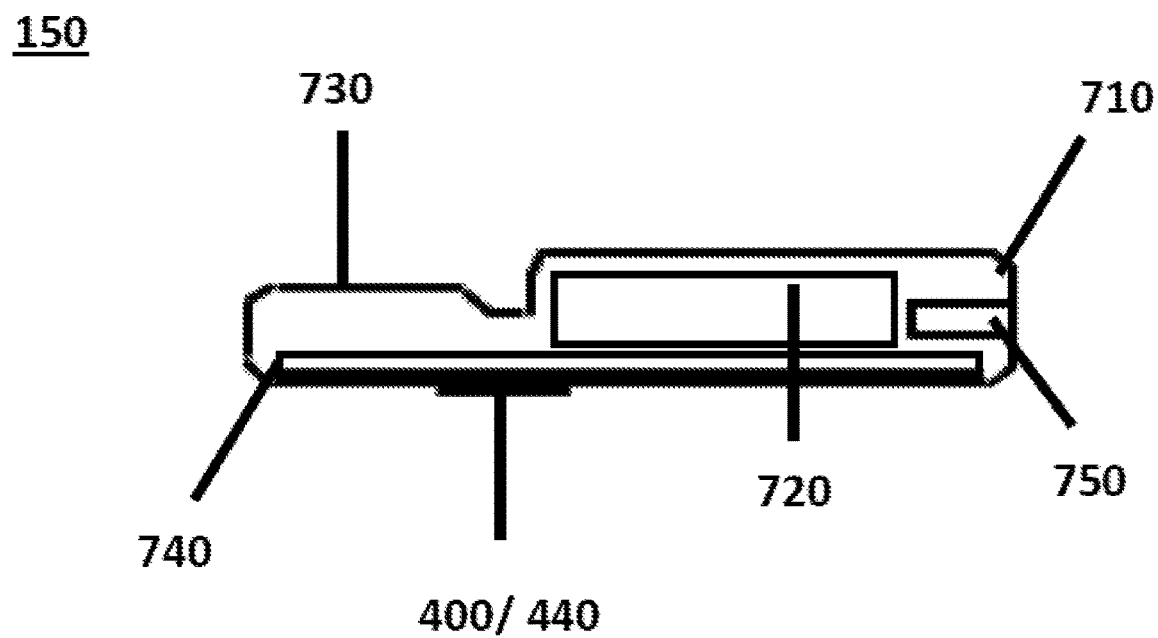
Figure 7B:
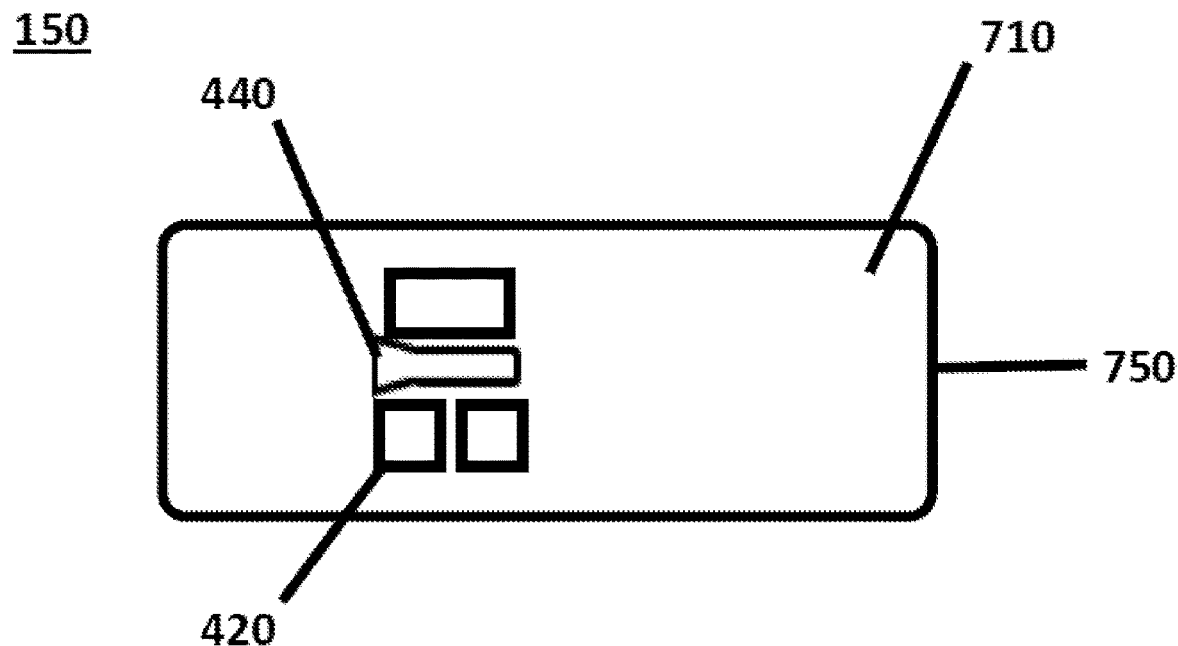
FIG. 7B depicts the full bottom plan view of the power supply unit shown in FIG. 7A.

FIG. 7A depicts a cross-section of a power supply unit 150 according to the current invention, wherein at least some of the features described above are depicted, along with additional optional features. As depicted in FIG. 7A, the power supply unit 150 has a housing that encloses a battery 720 (e.g. a rechargeable Li-ion battery) and a switch 730 and a printed circuit board (PCB) 740 that houses the relevant electronics to operate the various component parts of the power supply unit depicted and described above. As shown, the housing contains the second interconnect member 400, with the projection 440 visible. In addition, FIG. 7A depicts a USB port 750, which may be used to charge the battery 720, when said battery is a rechargeable battery. It will be appreciated that in certain embodiments that a USB port may be absent, with the second interconnect 400 enabling a rechargeable battery to be charged or the rechargeable battery may be adapted so that it can be charged using wireless power. FIG. 7B shows the same power supply unit from the bottom face, that is the face housing the second interconnect unit, showing magnets 420 on either side of groove 440 and the USB port 750.

FIGS. 8 to 11 describe the arrangement of an embodiment of the entire integrated device 100 as and how the device 100 may be used.

Figure 8:
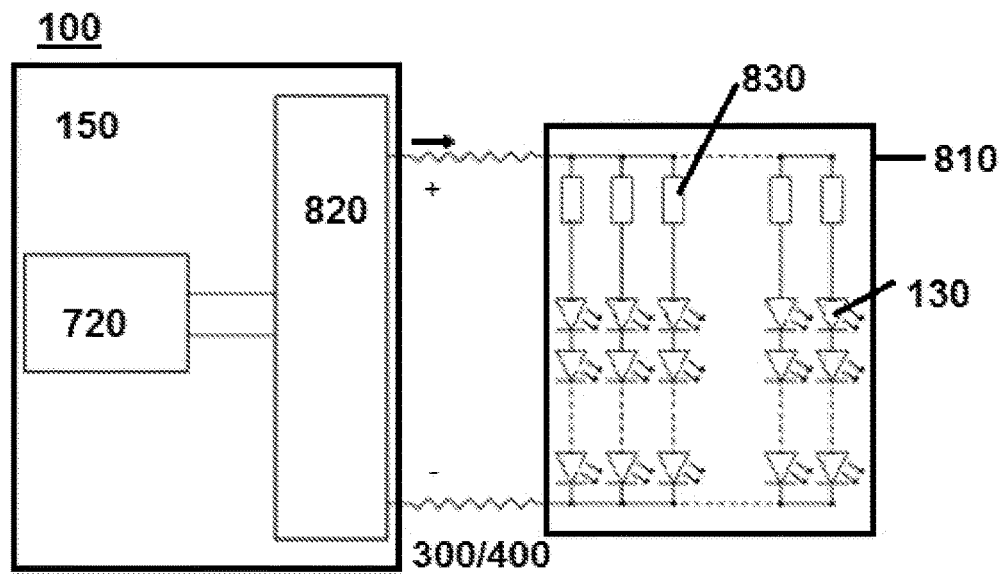
FIG. 8 depicts an electronic circuit schematic of an embodied device according to the current invention.
Figure 9:
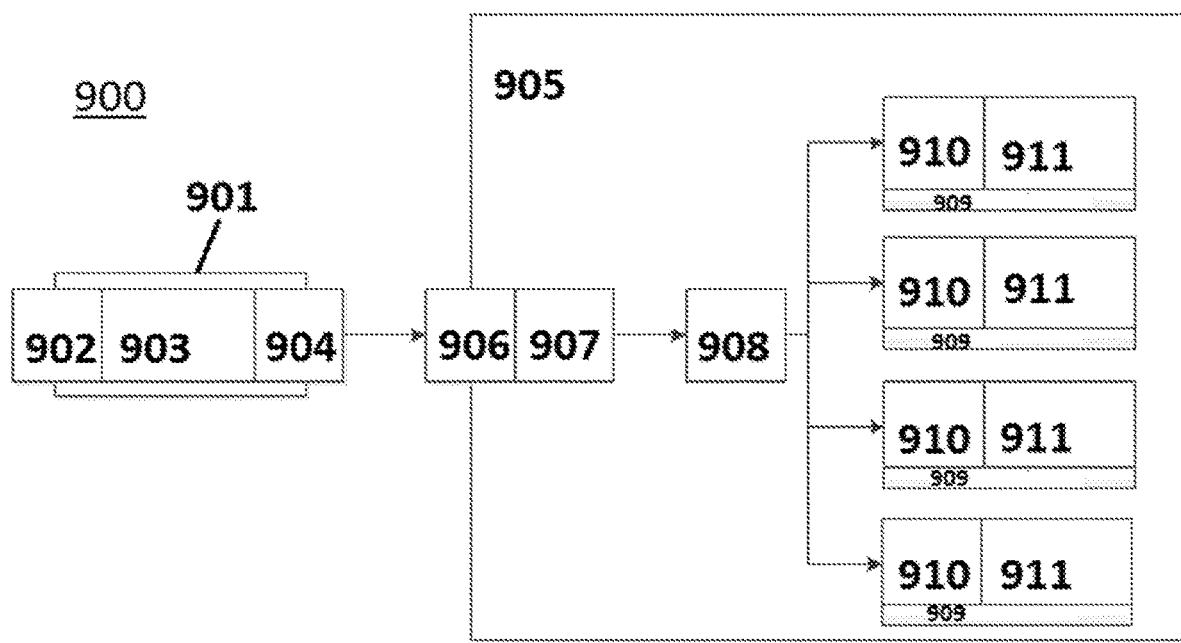
FIG. 9 depicts a full device according to the current invention in schematic form.
Figure 10:
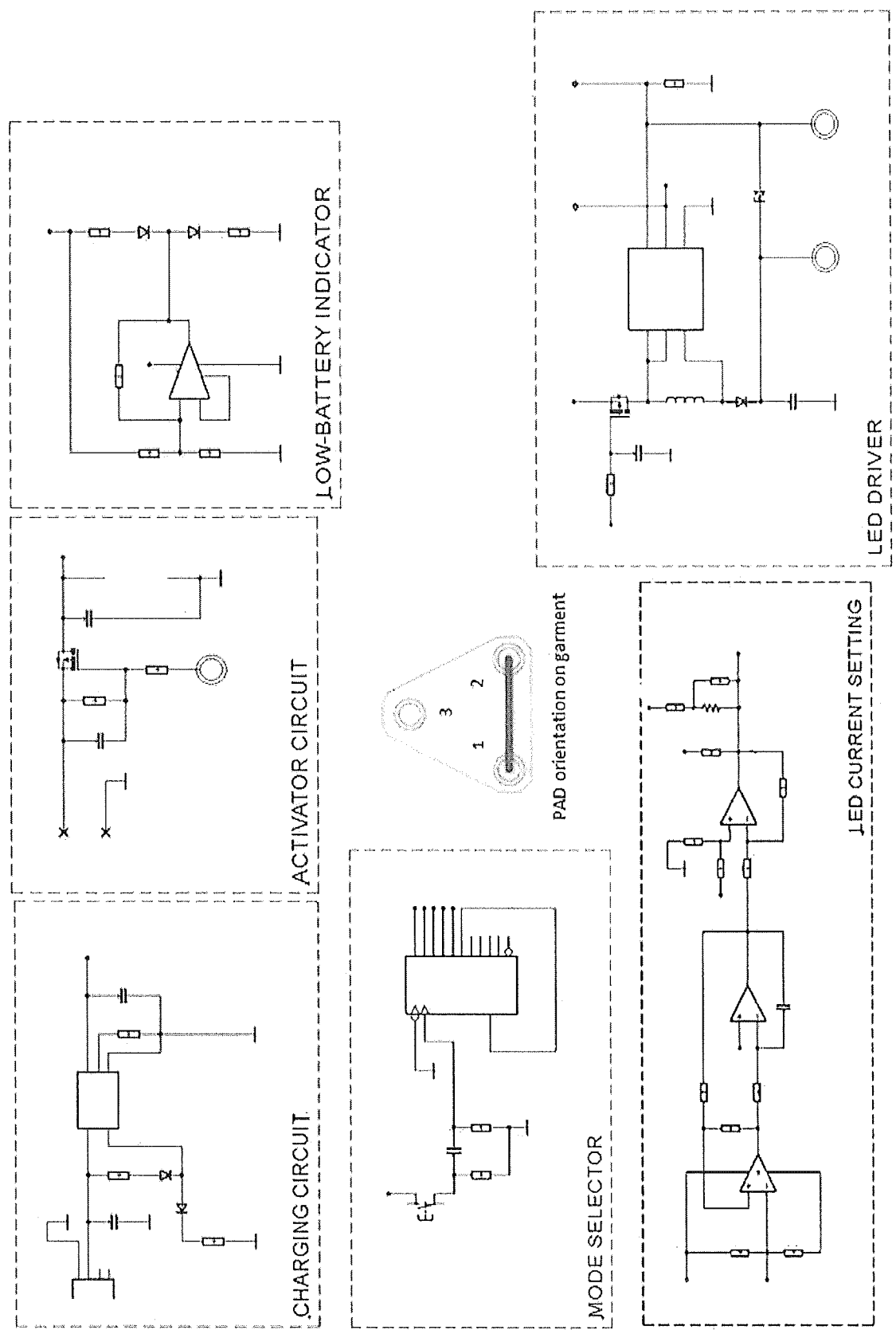
FIG. 10 depicts the electrical circuits used within the power module of an embodiment of the invention, though not shown in connection.

FIG. 8 depicts the device 100 as an electronic circuit schematic. As shown, the device 100 requires the presence of a detachable power module 150 that is connected to the wiring of the lighting module 810 by an interconnect 300/400. As depicted, the battery module may contain a battery 720 (e.g. a rechargeable Li-ion battery operating at around 3.7 Volts) and a DC-DC Boost Converter 820 (e.g. to step-up the voltage from 3.7 Volts to 24 Volts). In this embodiment, the lighting module contains several lighting source strips integrated into a textile (not shown) containing the following either LEDs or OLEDs that are encapsulated in a flexible polymer (not shown), as discussed in more detail hereinafter. In certain embodiments of the invention, the battery module may further contain all of the power and driving electronics necessary to operate the device, as illustrated in FIGS. 9 and 10. To help protect the light sources 130, a current-limiting resistor may be added.

FIG. 9 depicts a full system 900 according to the current invention in schematic form. As depicted, the power supply unit 901 contains a USB connector 902 a power module 903 (which contains a battery, a DC-DC converter, switching module, automatic light sensor and electronics to drive these components on a printed circuit board) and an interconnect 904 to contact the interconnector (906; i.e. contact pads) on a garment 905 (though this may be any other object made from a fabric or a textile). The garment 905 contains an interconnect 906 to interface with the interconnect 904 of the power supply unit (e.g. the magnetic interconnector described herein, or any other suitable interconnector), components 907 to transfer the electrical current from said interconnect 906 to a conductive yarn 908 (this may also be a wire or a printed conductive path (e.g. a conductive paste)) to one or more lighting strips 909, which lighting strips 909 comprise a circuit module interconnection 910 and a lighting module (e.g. a LED).

FIG. 10 more clearly depicts the electrical circuits used within the power module of an embodiment of the invention, though not shown in connection, whereas FIG. 11 describes the physical system architecture and interaction of these components.

The Power module can be separated into four entities by their main function: charging 1101, mode selector 1102, DC-DC converter 1103 and detachable interconnection 1104. The main function of the charging part of the power module 1100 is charging the battery 1105 of the lighting system by means of a USB connector 1106 and providing the user with feedback by means of a charging indicator LED 1107. While the device depicted here uses a separate USB connector 1106 to achieve the charging, it is contemplated that the interconnect system, as described in more detail below can also achieve the same effect. In addition, it is contemplated that the power module could also make use of swappable batteries (e.g. alkaline batteries).

When the power module 1100 is plugged into an USB wall-mount adaptor or USB port, power will be drained from the attached power source in order to charge the internal battery 1105 of the power module. The charging interface will regulate the current and voltage levels to charge the battery 1105 (e.g. any rechargeable battery, such as a Li poly battery and a Li-ion battery). The power module 1100 will monitor the power level of the battery to ensure proper charging and the charging interface 1108 will also drive an indicator LED providing the user with visual feedback about the charging status of the battery (e.g. red while charging, green/off when full). A voltage comparator 1109 is implemented into the power module to warn the user that the battery only has 20% charge left by lighting up a red LED 1111.

In order to control the lighting system, the battery module may also contain a mode selector 1102 that is responsible for setting the desired lighting mode of the lighting apparatus. The mode selector 1102 comprises a tactile switch 1112, light mode selector circuitry 1113, current regulating resistors for 50% (1114) and 100% (1115) brightness settings, a light dependent resistor 1116 and a pulse generator 1117 circuit. These components can be used to select any one of the following modes, in the order presented.

Off
50% brightness setting
100% brightness setting
Automatic brightness (by light dependent resistor; LDR)
"Breathing" Animation with automatic brightness (by LDR and pulse generator)

By default, the system will be on the "Off state". This means that no light will be produced by the system. By pressing the tactile switch, the selector will move forward one mode per click. As noted above, attached to the mode selector are different sub systems to create the different modes. An ambient light sensor in the form of an LDR is used in the last 2 modes to allow the system to respond to the environmental lighting conditions. A pulse generator may be incorporated to generate a varying breathing-like animation that can be used in the last mode. The mode selector selects one or more of the sub-systems (as required) and electrically connects them to the DC-DC converter 1103.

The main function of the DC-DC converter 1103 is to scale the voltage level of the battery up to a higher potential in order to drive the lighting modules. This is needed to compensate for voltage drops over the circuit on the garment that connects the lighting modules to the power module. The DC-DC converter may be set to the required current based on input from the mode selector.

A voltage comparator 1109 is included in the power module to measure the battery's charge level. When the battery charge gets below 20%, a red LED will light up 1111, notifying the user that the system should be charged again.

A re-attachable interconnection 1104 is the bridge between the power module and the garment. It makes an electrical interconnection, allowing power to flow from the power module's DC-DC converter 1103 to interconnect component attached to the power module. As discussed in more detail hereinbefore, the interconnect may be made using magnetic interconnection components on the power module and the garment, which allowed the connection to be made and broken in easily. This allows the power module and garment to be bonded for use and separated for charging and washing with little difficulty.

Alternatively or additionally, the brightness of the device may also be controlled by:
(a) a proximity sensor to control the brightness depending on the closeness to an object; and/or
(c) a sound detector to control the brightness depending on the ambient volume; and/or
(d) a temperature sensor to control the brightness depending on the temperature.

It will be appreciated that the mode selector may make use of none, one or a combination of the above sensors and the light detector (e.g. light dependant resistor) to control the brightness of the light sources.

It will be appreciated that the device described above may also be suitable for use in transmitting data by Li-Fi. Light Fidelity (Li-Fi) is a bidirectional, high speed and fully networked wireless communication technology similar to Wi-Fi. Li-Fi is a subset of optical wireless communications and can be a complement to RF communication (Wi-Fi or Cellular network), or a replacement in contexts of data broadcasting. It is so far measured to be about 100 times faster than Wi-Fi, reaching speeds of 224 gigabits per second. It is wireless and uses visible light communication or infra-red and near ultraviolet (instead of radio frequency waves) spectrum, part of optical wireless communications technology, which carries much more information, and has been proposed as a solution to the RF-bandwidth limitations. In the context of current embodiments of the invention, the device may further comprise a sensor and/or control system that can make use of the light sources within the device to transmit data gathered by a sensor (e.g. an accelerometer, 9-axis sensor or any other compatible data gathering device) to a receiver in a nearby Li-Fi enabled device, such as a cellular telephone (i.e. a smart telephone), a computer or directly onto a server using an internet connection established by Li-Fi. It will be appreciated that the sensor/controller is able to adjust the intensity (i.e. brightness) of the light generates by the light source(s) at high speed, while maintaining illumination, though invisible light may be used instead (as mentioned above).

The garment or textile/fabric component can be split into two main sub-systems: the lighting system and the other half of the re-attachable interconnection. As shown in FIG. 12, the lighting system can contain three lighting modules, the modules provide visual lighting at several locations on the garment or textile/fabric. Each lighting module is a strip with several light emitters 1205 (in the embodiment shown, LEDs or OLEDs). The re-attachable interconnection 1201 is the bridge between the power module and the garment. The interconnection that forms part of the lighting module makes an electrical interconnection with the corresponding component on the power module, allowing power to flow from the connector pads to the individual lighting modules to light them. As is discussed in more detail hereinbefore, the connection can be made and broken easily, allowing the power module and garment (or textile/fabric) to be bonded for use and separated for charging and washing.

As discussed herein, the textile or fabric may be in the form of a garment or other object made from such materials (e.g. a bag). When the textile or fabric is in the form of a garment, the garment may be any wearable object, such as shorts, socks, T-shirts, trousers, leggings, shirts, caps, footwear (e.g. shoes, boots, training shoes etc) and accessories (e.g. head bands, arm warmers, wristbands etc).

FIG. 12 depicts the lighting module of an embodiment of the current invention. The lighting module 1200 comprises landing pads 1201 for the conductive yarn on a textile to interface with the electrical components on the lighting module, which landing pads are connected (e.g. by electrical traces) to one or more current limiting resistors for LEDs (1202-1204) and multiple LEDs (1205).

FIGS. 13A and 13B disclose a T-shirt 1100, shorts 1200 and FIG. 14 depicts a long-sleeved shirt 1300 according to embodiments of the current invention, depicting an integrated lighting system in a garment. As shown in these figures, there are lights 1120, which may be one or more of light emitting diodes (LEDs), organic light emitting diodes or an electroluminescent material, that are attached to the front, back and/or sides of the garment to provide illumination. The lights are connected by some form of wiring (not shown) to a power supply unit 1130, which provides power and may perform additional functions as discussed in more detail below. In addition to the lights 1120, the garments may also contain passive reflective strips 1140 to reflect light from the beam of a vehicle and may help make a wearer more visible in low-light conditions.

The embodiments of FIGS. 13 and 14 relate to sports garments with unobtrusive integrated electronics in accordance with the embodiments of the invention disclosed hereinbefore. In these garments, one or more flexible lighting apparatus 120 are embedded into the garment, drastically increasing the visibility of the wearer while performing running exercises, especially in a dim environment. The one or more flexible lighting apparatus 120 contain light engine elements 130 (LED, OLED) according to a pre-defined pattern, color and shape. A separate electronics module can be attached and detached from the garment, which incorporates the driving electronics, rechargeable battery and a switch which is the main interface for the user to select the desired lighting mode (on and off/breathing animation/set brightness/automatic brightness).

It will be appreciated that while the current invention may be integrated into sportswear, embodiments of the current invention may also relate to the use of the integrated lighting system in any fabric or textile. In particular, the lighting system may be integrated into any type of garment, such as, but not limited to, accessories (such as head bands, arm warmers, wristbands, etc), uniforms for rescue workers, night patrol etc, construction or safety wear, winter sports, mountaineering clothing and gear, caps and footwear. As will be apparent, the lighting system may also be integrated into non-wearable devices made of fabrics or textiles, such as a bag.

While the embodiments depicted in FIGS. 13 and 14 are described above as providing an illumination purpose, similar garments may be designed to achieve different effects on the human body (or to mix-and-match such effects). For example, instead of using light source that is faced away from the body (i.e. for the purposes of illumination or other effects), the light source may instead be directed towards the body instead. In such embodiments, the light source may be a LED or an OLED (or other light source) that is adapted to provide light at a wavelength that may increase the energy levels of the human body, such as increasing the energy generation of mitochondria in the cells of the muscles, which may aid the recovery of sportsmen/athletes to recover faster from pain and/or physiological fatigue to a normal state. Similar systems may be used to aid subjects that are suffering from pain (such as chronic back pain). In these embodiments, various light sources may be directed towards the skin of the wearer and may be positioned in areas that are desired for treatment (e.g. the legs, arms or back of a wearer). While any suitable light source may be used, it is noted that visible red and near infra-red light sources may be particularly suitable for this application (see for example Pain Res Manag. 2006 Autumn; 11(3): 193-196).

It will be appreciated that the inverted arrangement of the light sources discussed herein, where light is directed towards the body, may additionally or alternatively be particularly useful in providing a source of heat to the skin, thereby causing the wearer to feel warmer, which may of particular importance in cool/inclement weather. While any light source may be used to accomplish this, particular embodiments of the invention herein may mention the use of infra-red light sources in this application.

A further use of the device described herein may be to effect cooling of the human body. For example, the light source may be arranged to use heat from the skin of a wearer as the energy source, resulting in a cooling of the wearer's skin. This may be accomplished by the use of specially adapted light sources that harvest the heat directly (through the polymer layers of the device) or by the use of body energy harvesting pads in place of a battery (e.g. said pads being made of a material that uses the Peltier effect to generate electricity.

In yet a further embodiment of this inverted arrangement of the light source, the garment may be adapted for use as a light-embedded near infra-red spectroscopy+pulse oximetry device, which can be used to measure relative haemoglobin levels in the human body and hence $VO_2$ max. As noted, the light sources may be near infra-red light sources (e.g. LEDs or OLEDs) and the device may further contain detection systems that may also be incorporated into the flexible and conformable light source apparatus that is described hereinbefore. Such an embodiment of the invention may be used to measure the fatigue level of the human body when worn by sportsmen/women, or for the provision of a medical diagnosis in other subjects. For example for sportspeople, measuring the oxygenation levels of blood close to a muscle at the start of, and during, exercise may give an athlete and their coach an indication of how well the targeted muscles are performing and how the training affects the target muscle. Thus, this embodiment of the current invention can be used as a tool for designing training programs that enhance and maintain maximum muscle efficiency and strength. Additionally, such measurements may be useful during standard training to help attain peak performance, or during training while recovering from an injury to a muscle.

Data from such a device would enhance this active and growing field of sport science and performance. It is also noted that such a device may have medical uses, such as monitoring the oxygenation of a baby's blood. Examples of the kinds of systems that may be adapted for use in the current invention are provided in J Clin Monit Comput. 1999 December; 15(7-8):441-7 and Anaesthesiology News Special Edition, October 2012, p 27-34 (http://www.anesthesiologynews.com/download/CerebralOximetry_ANSE12_WM.pdf).

Further applications of a light source directed towards the skin in the current invention include garments that may be beneficial for the detection and treatment of cancer. Detection can be accomplished by using specific wavelengths of the visible or broader light spectrum that can be reflected or absorbed by particular cancer cell types such that the variation between the total light input versus output can be measured to see amount of reflection or absorption and can therefore detect changes in cells, leading to the detection of cancer. In relation to the treatment of cancer, the light source may be a UV light source that is used in photodynamic therapy.

In addition to the embodiments described above, it is also possible to include reflective materials as part of the device. For example, as shown in FIGS. 15-18.

Figure 15:
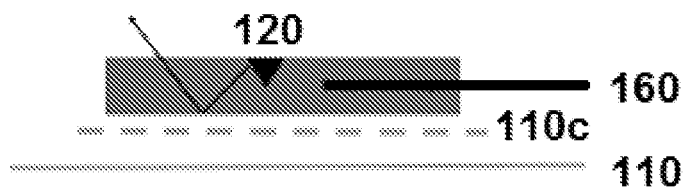

FIG. 15 schematically depicts an encapsulated light source 120 (the light source being encapsulated in a polymer 160 as described before), where a reflective layer 110c is placed between the fabric 110 and the light source 140. As shown, the light source 120 is arranged to emit light at an angle relative to the reflective layer, as illustrated by the arrow in said figure. The reflective layer may be placed in alternative arrangements (e.g. between the light source and the skin in a garment where the light source is directed towards the skin), which may generate a more diffuse light.

In addition, the reflective layer may be coloured so as to change the colour of the light perceived by an observer, and/or it may be patterned to produce pattern/shape made from the light.

Figure 16A:
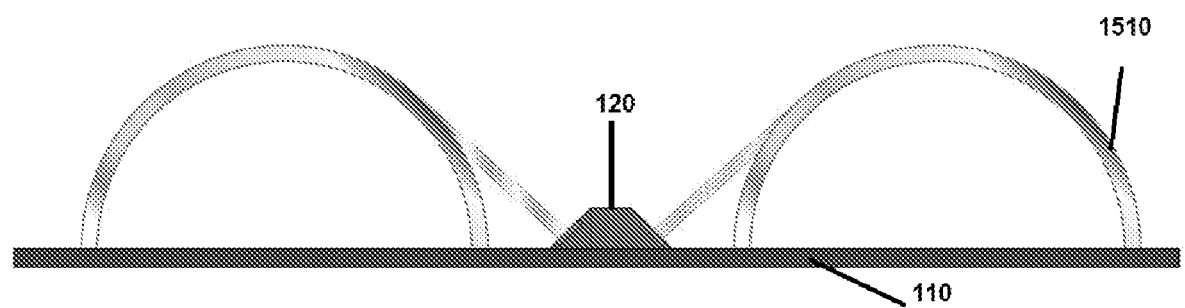
Figure 16B:
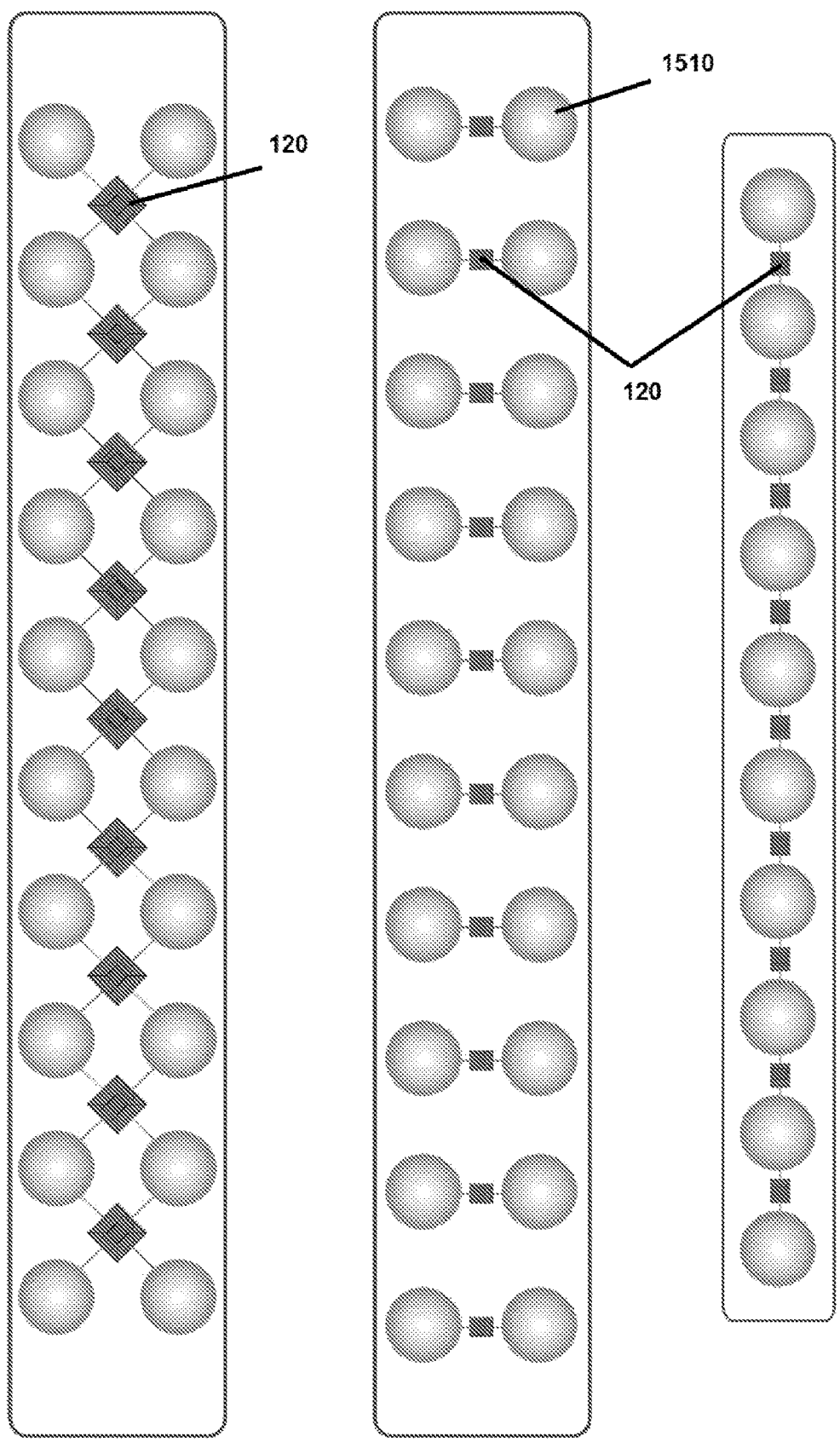
Figure 17:
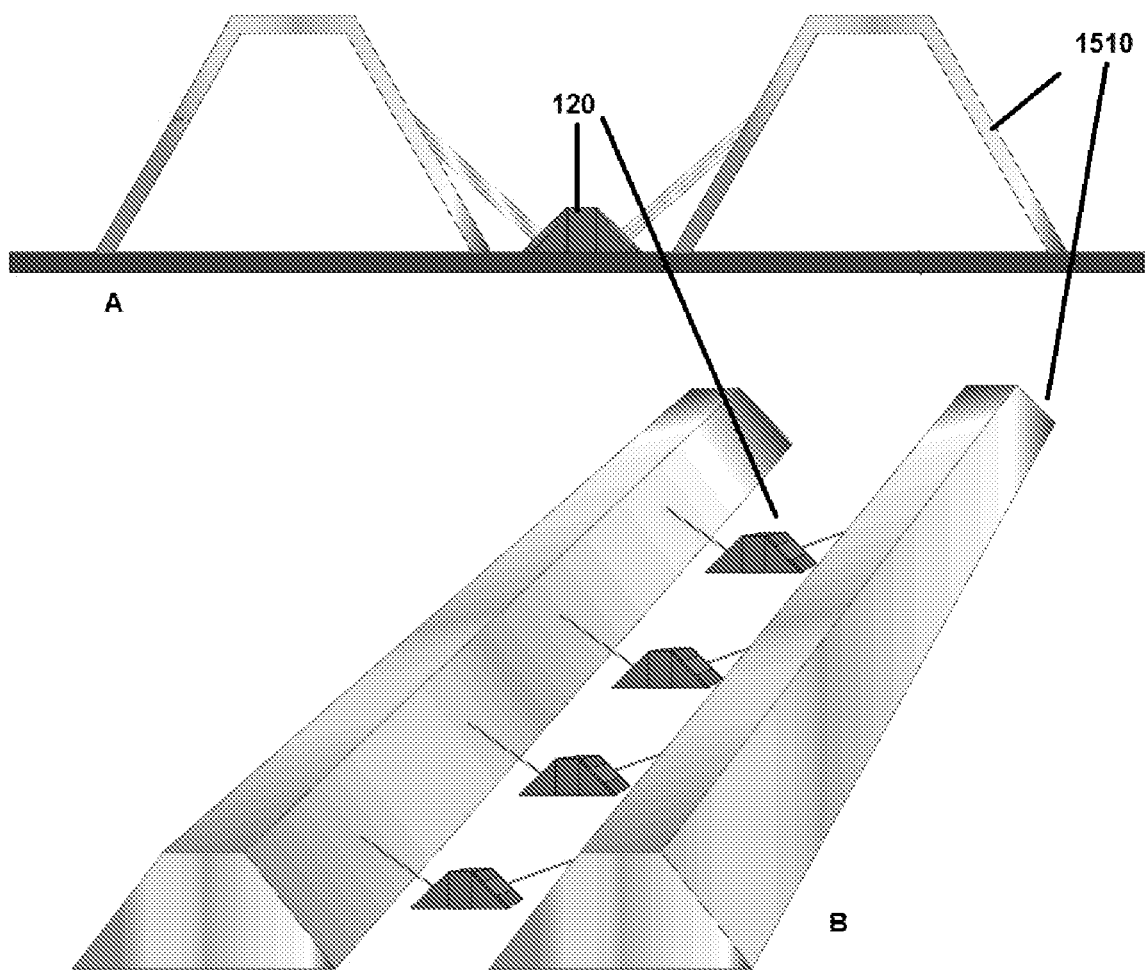
Figure 18:
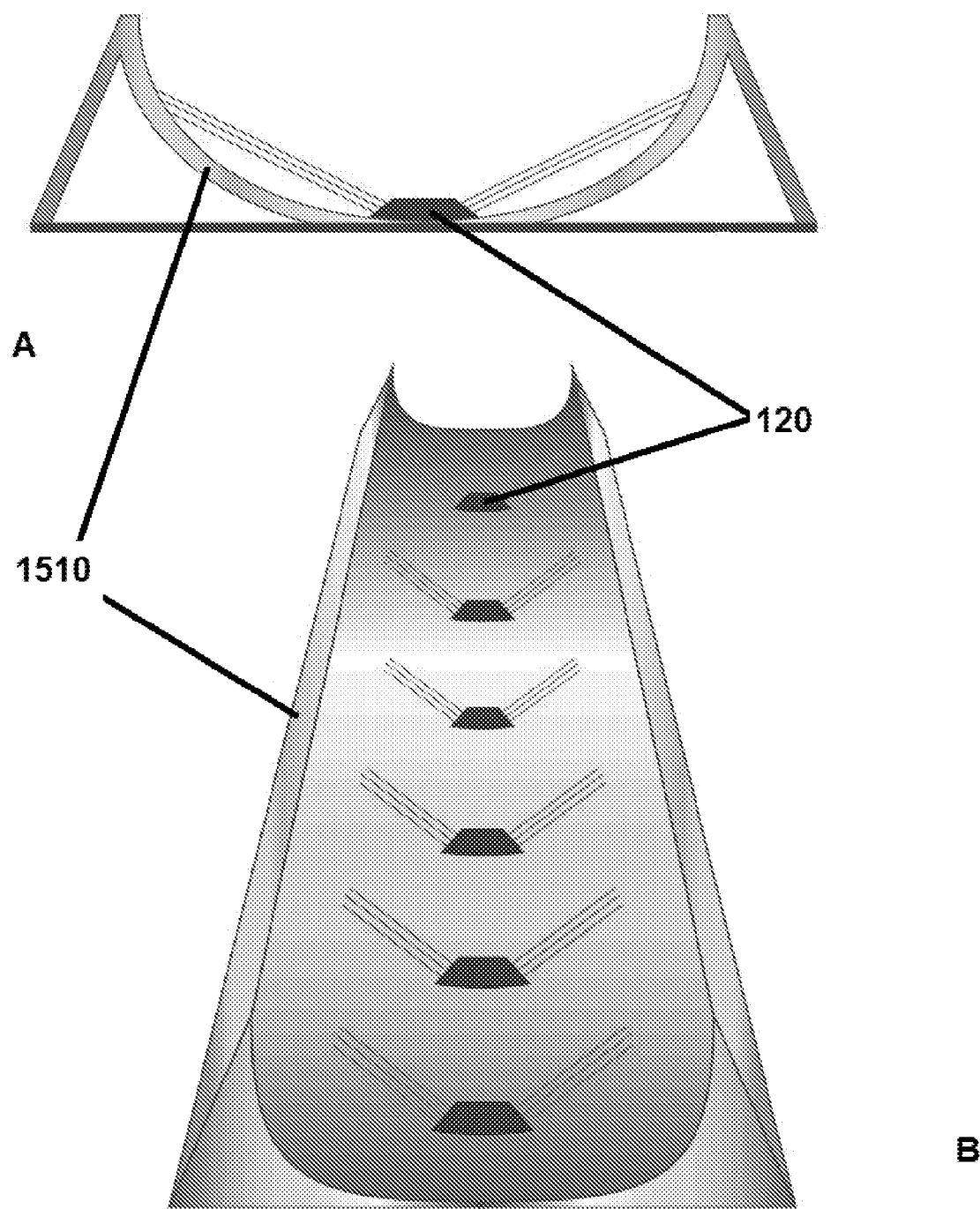

FIG. 16A depicts a further embodiment of the current invention, where the lighting apparatus is arranged on the surface of a textile or fabric and is positioned such that the light sources 140 project their light diagonally to said surface onto a reflective dome 1510. As shown in FIG. 16B, the light sources may be arranged to provide a linear or cross-shaped projection of light onto a plurality of reflective domes 1510 to generate different lighting effect. As before the reflective domes may be patterned and/or may be coloured.

FIGS. 17a and 17b depict a further arrangement of the concept described and depicted in FIG. 16, where trapeziod-shaped reflective surface 1510 is used instead of the dome-shapes shown in FIG. 16. FIGS. 18a and 18b depict another possible arrangement of the concept described and depicted in FIG. 16, where the lighting apparatus is placed within a concave reflective member 1510.

The devices described herein may have the advantages of being easier and more comfortable to wear, greater flexibility and conformability of the electrical components in the garment and be easier to maintain and wash. For example, garments and textiles of the current invention may be capable of being washed at least up to 30 times (e.g. at least up to 50 times, such as at least up to 100 times) without affecting the function of the flexible and conformable light source apparatus attached to the textile or garment.

The invention claimed is:
1. A device comprising:
a textile or fabric; and
a flexible and conformable light source apparatus attached to the textile or fabric, wherein the light source apparatus comprises:
at least one light source;
at least two conductive members having a first end and a second end, the first end is connected to the at least one light source and the second end is adapted to releasably connect to a power source, so that the power source can be physically removed from the device; and at least one transparent polymer layer that encapsulates the entirety of the at least one light source and part of the at least two conductive members including at least the first end but not the second end,
wherein the power source is physically removed to machine-wash the device without damage to the light source apparatus and without damage to the textile or fabric.

2. The device according to claim 1, wherein the light source is selected from one or more of the group consisting of a light emitting diode (LED), an organic light emitting diode (OLED), an electroluminescent material, and an optical fiber.

3. The device according to claim 1, wherein the light source is attached to the textile or fabric by the at least one transparent polymer layer.

4. The device according to claim 1, wherein the flexible and conformable light source apparatus further comprises at least one flexible substrate with at least one electrical circuit thereon, where the at least one light source is attached to the at least one flexible substrate through the at least one electrical circuit and the at least one electrical circuit is connected to the at least two conductive members, wherein:
(a) the at least one light source is attached to the at least one electrical circuit by an isotropic conductive adhesive;
(b) the at least one electrical circuit comprises at least one of silver or copper; or
(c) the at least one electrical circuit is a printed electrical circuit or a lithographically etched electrical circuit.

5. The device according to claim 4, wherein, when the at least one flexible substrate and textile or fabric define a plane, the flexible and conformable light source apparatus further comprises at least one reflective object adjacent to the at least one light source on said plane and the at least one light source is positioned on the flexible substrate at an angle on said plane such that light generated from the at least one light source is reflected by the at least one reflective object.

6. The device according to claim 5, wherein the at least one reflective object is a shape selected from the group consisting of a prism, a sphere or part thereof, a concave cup shape, a retroreflective tunnel and one or more fiber optic cables.

7. The device according to claim 1, wherein the conductive members may be one or more of the group selected from a wire, a conductive yarn, a screen-printed conductive path and combinations thereof.

8. The device according to claim 1, wherein the device further comprises a power supply unit and an electrical interconnect to connect the power supply unit to the light source apparatus.

9. The device according to claim 8, wherein the power supply unit comprises a battery and a DC-DC boost converter.

10. The device according to claim 9, wherein the power supply unit further comprises a switching module adapted to control a number of lighting modes of the light source.

11. The device according to claim 8, wherein the power supply unit further comprises at least one of:
(a) an ambient light detector adapted to control the brightness of the light source based upon the ambient light conditions, optionally wherein one or more of the lighting modes of the switching module is controlled fully or in part by the ambient light detector;
(b) a proximity sensor to control the brightness depending on the closeness to an object;
(c) a sound detector to control the brightness depending on the ambient volume; and
(d) a temperature sensor to control the brightness depending on the temperature.

12. The device according to claim 1, wherein the textile or fabric is formed into a garment or a bag, wherein when the textile or fabric is formed into a garment, the garment is selected from shorts, socks, T-shirts, trousers, leggings, shirts, caps, footwear and accessories (e.g. head bands, arm warmers, wristbands) uniforms for rescue workers, night patrol, construction or safety wear, winter sports, and mountaineering clothing and gear.

13. The device of claim 12, wherein the device is part of a garment.

14. The device according to claim 1, wherein the flexible and conformable light source apparatus has a thickness that is less than or equal to 1000 μm.

15. The device according to claim 14, wherein:
(a) the flexible and conformable light source apparatus has a bending radius of from 0.001 mm to 10 mm; and
(b) the flexible and conformable light source apparatus has more than one light source, and the distance between the light sources is at least 0.1 cm.

16. The device according to claim 1, wherein the at least one transparent polymer layer is a material selected from one or more of the group consisting of TPU, a silicone-based polymer, a plasma-treated textile substrate and a water repellent textile substrate.

17. The device according to claim 1, wherein:
the at least one light source is positioned to face towards the textile or fabric, and
an opening in the fabric or textile aligns with the at least one light source.

18. The device according to claim 1, wherein the at least one light source is positioned to face away from the textile or fabric.

19. The device of claim 1, wherein the device is capable of being washed at least up to 30 times without affecting the function of the flexible and conformable light source apparatus attached to the textile or garment.

20. The device of claim 1, wherein the at least two conductive members are electrically insulated across their entire length, except at a first portion adjacent to and including the first end and a second portion adjacent to and including the second end, both of which are uninsulated and the first portions of the at least two conductive members are fully encapsulated by the at least one transparent polymer layer.

* * * * *